(12) United States Patent
Chauhan et al.

(10) Patent No.: US 11,823,591 B2
(45) Date of Patent: Nov. 21, 2023

(54) EMOTIONAL MANAGEMENT SYSTEM

(71) Applicant: Microsoft Technology Licensing, LLC, Redmond, WA (US)

(72) Inventors: Vivek Chauhan, Kirkland, WA (US); Wendy Guo, Edmonds, WA (US); Danny Lee Fraser, Mill Creek, WA (US); Justin Joseph Fagnan, Bellevue, WA (US); Leanna Holly Robb, Seattle, WA (US); Chi Huang, Bothell, WA (US); Darren Glenn Austin, Seattle, WA (US); Jinkai Zhang, Suzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 17/145,180

(22) Filed: Jan. 8, 2021

(65) Prior Publication Data
US 2022/0223064 A1    Jul. 14, 2022

(51) Int. Cl.
| | |
|---|---|
| *G09B 7/00* | (2006.01) |
| *G06F 3/0482* | (2013.01) |
| *G06Q 10/0639* | (2023.01) |
| *G06Q 10/10* | (2023.01) |

(52) U.S. Cl.
CPC .............. *G09B 7/00* (2013.01); *G06F 3/0482* (2013.01); *G06Q 10/06395* (2013.01); *G06Q 10/103* (2013.01)

(58) Field of Classification Search
None
See application file for complete search history.

(56) References Cited

U.S. PATENT DOCUMENTS

| | | | |
|---|---|---|---|
| 9,955,902 B2 * | 5/2018 | Frank | A61B 5/746 |
| 10,074,368 B2 | 9/2018 | Ogunyoku et al. | |
| 2013/0253971 A1 * | 9/2013 | Nudd | G06Q 10/06 705/7.14 |
| 2014/0207811 A1 | 7/2014 | Kim et al. | |

(Continued)

OTHER PUBLICATIONS

Williams, et al., "Supporting Workplace Detachment and Reattachment with Conversational Intelligence", In Proceedings of the CHI Conference on Human Factors in Computing Systems, Apr. 21, 2018, 13 Pages.

(Continued)

*Primary Examiner* — Nathan Hillery
(74) *Attorney, Agent, or Firm* — Barta, Jones & Foley, PLLC

(57) ABSTRACT

The disclosure herein describes an emotional insight management system that provides user-configured prompts and insights to the user. In some examples, an insights application provides personalized, recurring prompts to encourage users to provide current emotional state updates to a well-being journal. The user's responses over time are aggregated within a historical trends report, which provides emotional response data over time. The insights application generates insights into potential reasons for the user's emotional states on a given day. The system analyzes the user-provided emotion response data with integrated work-related data to identify reasons for the user's mood and make recommendations for actions to be taken by users to reduce stress and improve the user's emotional well-being.

18 Claims, 17 Drawing Sheets

(56) References Cited

U.S. PATENT DOCUMENTS

| | | | | |
|---|---|---|---|---|
| 2015/0088542 | A1* | 3/2015 | Balassanian | A61B 5/165 |
| | | | | 705/2 |
| 2016/0139884 | A1* | 5/2016 | Valentino | G09B 23/00 |
| | | | | 709/219 |
| 2018/0053503 | A1* | 2/2018 | Ogunyoku | G08B 25/016 |
| 2018/0122509 | A1 | 5/2018 | Christiansson | |
| 2018/0150762 | A1* | 5/2018 | Stolarz | G06F 3/0482 |
| 2018/0218289 | A1* | 8/2018 | Albrecht | G16H 50/80 |
| 2018/0365618 | A1* | 12/2018 | Hardy | G06F 21/6254 |
| 2018/0365619 | A1* | 12/2018 | Hardy | G06F 21/6254 |
| 2019/0050774 | A1 | 2/2019 | Divine et al. | |
| 2019/0159677 | A1* | 5/2019 | Soyao | G16H 20/10 |
| 2019/0355271 | A1 | 11/2019 | Dawson et al. | |
| 2020/0152304 | A1* | 5/2020 | Chang | G10L 25/63 |
| 2020/0152323 | A1 | 5/2020 | Johnstone et al. | |
| 2020/0387873 | A1* | 12/2020 | Ravi | G06Q 10/1095 |
| 2021/0042854 | A1* | 2/2021 | Hazy | H04L 67/306 |
| 2021/0052204 | A1* | 2/2021 | Misra | G06F 16/9535 |
| 2021/0065854 | A1* | 3/2021 | Hanold | A61B 5/14532 |
| 2021/0076002 | A1* | 3/2021 | Peters | H04N 7/152 |
| 2021/0383416 | A1* | 12/2021 | Treiser | G06F 16/288 |

OTHER PUBLICATIONS

Bolton, Sharon, "Emotion Management in the Workplace", In Publication Red Globe Press, Jan. 2005, 7 Pages.

Clark, Timothy R., "8 Ways to Manage Your Team While Social Distancing", Retrieved from: https://hbr.org/2020/03/8-ways-to-manage-your-team-while-social-distancing, Mar. 24, 2020, 3 Pages.

Stefano, et al., "Making Experience Count: The Role of Reflection in Individual Learning", Retrieved from:https://papers.ssrn.com/sol3/papers.cfm?abstract_id=2414478, Jun. 14, 2016, 37 Pages.

Craig, Heather, "17 Emotional Intelligence Tests and Assessments", Retrieved from: https://positivepsychology.com/emotional-intelligence-tests/, Sep. 1, 2020, 24 Pages.

Dierdorff, et al., "Research: We're Not Very Self-Aware, Especially at Work", Retrieved from: https://hbr.org/2015/03/research-were-not-very-self-aware-especially-at-work, Mar. 12, 2015, 7 Pages.

Eurich, Tasha, "Working with People Who Aren't Self-Aware", Retrieved from: https://hbr.org/2018/10/working-with-people-who-arent-self-aware, Oct. 19, 2018, 9 Pages.

Farh, et al., "Emotional Intelligence, Teamwork Effectiveness, and Job Performance: The Moderating Role of Job Context", In Journal of Applied Psychology, vol. 97, Issue 4, Mar. 2012, pp. 890-900.

Greenwood, et al., "Research: People Want Their Employers to Talk About Mental Health", Retrieved from: https://hbr.org/2019/10/research-people-want-their-employers-to-talk-about-mental-health, Oct. 7, 2019, 3 Pages.

Wigert, et al., "Employee Burnout, Part 1: The 5 Main Causes", In Workplace, Jul. 12, 2018, 6 Pages.

Huffington, et al., "Working Below the Surface: The Emotional Life of Contemporary Organizations", In Publication of Routledge, Apr. 24, 2018, 43 Pages.

Lieberman, Charlotte, "What Wellness Programs Don't Do for Workers", Retrieved from: https://hbr.org/2019/08/what-wellness-programs-dont-do-for-workers. Aug. 14, 2019, 3 Pages.

Moss, Jennifer, "Burnout Is About Your Workplace, Not Your People", Retrieved from: https://hbr.org/2019/12/burnout-is-about-your-workplace-not-your-people, Dec. 11, 2019, 3 Pages.

Pescosolido, Anthony T, "Emergent leaders as managers of group emotion", In Journal of The Leadership Quarterly, vol. 13, Issue 5, Oct. 2002, pp. 583-599.

Seppälä, Emma, "Good Bosses Create More Wellness than Wellness Plans Do", Retrieved from: https://hbr.org/2016/04/good-bosses-create-more-wellness-than-wellness-plans-do, Apr. 8, 2016, 4 Pages.

Seppälä, et al., "Proof That Positive Work Cultures Are More Productive", Retrieved from: https://hbr.org/2015/12/proof-that-positive-work-cultures-are-more-productive, Dec. 1, 2015, 6 Pages.

Silvis, Gerlinde, "Emotional boarding using the 'check-in'", In Executive MA Thesis, 2015, 55 Pages.

Smith, Ryan, "How CEOs Can Support Employee Mental Health in a Crisis", Retrieved from: https://hbr.org/2020/05/how-ceos-can-support-employee-mental-health-in-a-crisis. May 1, 2020, 7 Pages.

Akgün, et al., "Organizational emotional capability, product and process innovation, and firm performance: An empirical analysis", In Journal of Engineering and Technology Management, vol. 26, Issue 3, Sep. 1, 2009, pp. 103-130.

\* cited by examiner

EMOTIONAL MANAGEMENT SYSTEM

BACKGROUND

Emotion journaling can be used to record thoughts or feelings on a given day or time. Journaling may be done with traditional pen and paper or with a journaling software, such as a software application. However, these types of journals are frequently limited to what the person writing happens to be thinking in the moment they are making an entry and fail to consider other relevant factors which the person may not be considering, such as work-related influences on their changing emotional state each day. Moreover, many people find it difficult to consistently make entries in a journal, resulting in haphazard and sporadic journaling which is of little benefit to the user and may become an additional source of stress. Thus, this type of manual journaling can be time-consuming, inefficient, and difficult to maintain consistently over time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized system and method for emotional insight management is provided. A communications interface device transmits a prompt to a user interface device via a network. The prompt comprising a pre-defined question associated with the emotional well-being of the user. The prompt includes a set of emotional state depictions representing a set of possible emotional states of the user. The user interface device receives a user response to the prompt. The response comprises a selection of a depiction from the set of emotional state depictions indicating a current emotional state of the user. A data storage device stores user data, including historical emotion response data and a journal. The journal includes a set of entries. The indicated current emotional state of the user is recorded within at least one entry in the set of entries. The historical emotion response data is analyzed with current work-related data obtained from a one or more collaborative work-related applications associated with the user. The historical emotion response data includes the emotion response indicating the current emotional state of the user. One or more causes of the current emotional state of the user is inferred by correlating the historical emotion response data with the work-related data obtained from the one or more collaborative work-related applications. One or more insights associated with the current emotional state of the user is generated based on the inferred causes of the current emotional state of the user. The one or more insights including at least one potential reason for the current emotional state of the user, wherein the one or more insights are presented to the user via the user interface device.

Other examples provide a method of emotional insight management. A communications interface device transmits a prompt to a user interface device via a network. A user interface device receives a user response to a prompt. The response comprises a selection of a depiction from a set of emotional state depictions indicating a current emotional state of the user. Historical emotion response data is analyzed with current work-related data obtained from a one or more collaborative work-related applications associated with the user. The historical emotion response data includes the current emotional state of the user. One or more causes of the current emotional state of the user is inferred by correlating the historical emotion response data with the work-related data obtained from the one or more collaborative work-related applications. One or more insights and at least one recommendation associated with the current emotional state of the user is generated based on the inferred causes of the current emotional state of the user. The one or more insights includes at least one potential reason for the current emotional state of the user. The recommendation includes at least one action to be performed by the user in response to the current emotional state of the user.

Still other examples provide computer storage devices having computer-executable instructions stored thereon for emotional insight management. A user interface device receives a user response to an initial prompt. The response includes a selection of a depiction from a set of emotional state depictions indicating a current emotional state of the user. A communications interface device transmits a secondary prompt to the user interface device via a network. The secondary prompt includes a customized follow-up question requesting additional information associated with the indicated current emotional state of the user. Historical emotion response data is analyzed with current work-related data obtained from a one or more collaborative work-related applications associated with the user. The historical emotion response data includes the at least one entry in the set of entries associated with the journal. At least one cause of the current emotional state of the user is inferred by correlating the historical emotion response data with the work-related data obtained from the one or more collaborative work-related applications. One or more insights associated with the current emotional state of the user is generated based on the inferred causes of the current emotional state of the user. The including at least one potential reason for the current emotional state of the user. The one or more insights are presented to the user via the user interface device.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
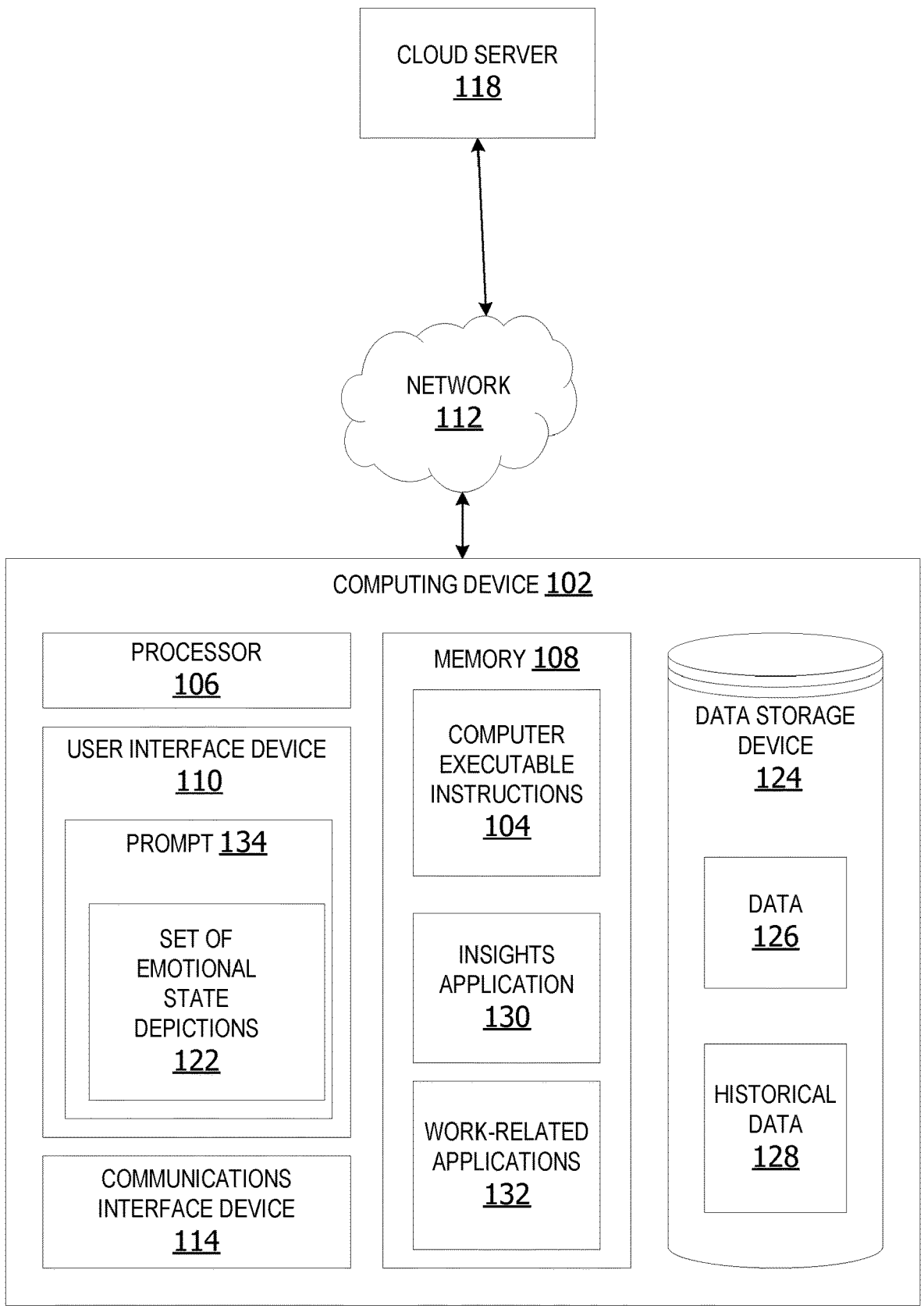
FIG. 1 is an exemplary block diagram illustrating a system for emotional insight management.

There are currently a variety of personal mood journaling applications available which allow user to journal and track their emotions over a period of time. However, these journaling applications only provide basic journaling, in which the user must remember to login and make entries. The journals merely accept and record the user's journal entries. These applications do not provide any additional assistance to the user. There is no technical solution available to help employees at work become more aware of their emotions throughout the workday.

The average employee spends nearly a third of their life at work. Emotional well-being is critical to overall well-being, productivity, and balance in the employee's life, but also for the productivity and well-being of colleagues and the company. This need for emotional awareness has increased with the current shift to remote work from home, which has amplified the challenges of emotional management for many employees.

Aspects of the disclosure, in some examples, provide an emotional insights management system. The system helps users to build a habit of emotional awareness through recurring reflection reminders, emotional journaling and provision of insights and recommendations. Emotional awareness at work has been shown to improve productivity, job performance, and well-being of employees. Teams with higher emotional awareness have been shown to be more effective, collaborative, and have fewer conflicts while working with colleagues than those that are not self-aware. A lack of emotional awareness in the workplace can increase stress and decrease motivation. Emotional intelligence is a competitive advantage for leaders and leaders who understand emotions can stimulate employees to be more effective and efficient in their output. For example, a user at work being aware of their feelings can help that user better collaborate with colleagues, be mindful of verbal and non-verbal communication, adjust their workload, better respond to team needs, and ask for help or support if needed.

In some examples, the system generates passive and active insights based on user-provided data and collaborative work-related data. The system insights assist users with developing the habit of mindfulness while better managing their emotional well-being in the work environment. This improves worker productivity and job satisfaction.

Some examples provide customized reminder prompts to the user to assist the user in building a habit of journaling emotions and practicing self-awareness. The act of reflecting and recording responses breeds self-awareness and has a positive impact on productivity and well-being. Self-awareness is not a one-off moment but a habit that needs reinforcement to develop. The automatic prompts provided by the system to users via work applications helps employees with reminders to reflect on their emotions at a desired frequency and reinforces the habit of mindfulness in the work environment.

Other examples provide a historical trends report containing a user's emotional state data over a period of time. The historical trends report enables a user to track their emotions at work over a period of time. This helps inform behavioral changes to improve productivity and well-being at work.

Aspects of the disclosure provide collaboration between the insights application system and other work-related applications. The insights application system analyzes work-related data describing work-related events with the user-provided emotional state data to generate predictive insights into work-related reasons for the user's current mood and suggest recommended actions to improve the user's emotional state and well-being based on the insights.

The system, in other examples, provides shared features applied in the context of a work environment and built into workplace productivity and collaboration tools. The system further takes into account the collaboration and productivity signals (meetings, sending email, etc.) to provide personalized solutions for the user in the work context. This enables generation of more accurate and customized insights and recommendations based on factors which might otherwise remain unnoticed or unavailable to the human user.

Still other examples provide an insights application system, which helps users to understand the benefit of self-reflection, share their feelings, and see history and insights based on their responses. This enables the user to become more self-aware and mindful, which improves emotional well-being and mental health by providing insights which would otherwise be unavailable to the user analyzing the situation with only the limited information typically available to a user attempting to journal manually without benefit of the integrated data analysis and trends data utilized by the insights application system.

The insights application system, in other examples, enables the user to sign up for personalized reminders to build a habit of reflection. The system provides reflection reminder notifications to the user based on the user's customized frequency, enabling the user to manage recurring reminders and readjust the reminders to fit the user's changing circumstances. This makes the system-generated prompts more efficient, convenient, and practical for the user while improving consistency in journaling by helping the user remember to maintain the habit.

In yet other examples, the historical trends reports generated by the system provide personalized insights on things the user can do to improve their well-being while assisting the user in recalling why the user was feeling a certain way on a given day. The system further provides motivational messages to encourage the user to continue consistent reflection. This assists the user in building a habit of self-reflection and emotional awareness.

The computing device hosting the insights application system operates in an unconventional manner by integrating work-related data obtained from a variety of work-related applications on a collaborative platform and analyzing that data with user-provided emotional state response data provided over time to generate personalized insights and recommendations associated with the user's emotional state on any given day. In this manner, the computing device is used in an unconventional way, and allows unique insights into a user's holistic workday and changing emotional state to help users to build a habit of emotional awareness.

The system dynamically integrates operations of a variety of collaborative, work-related applications enabling the insights application to access and utilize dynamic work-related data for generating more accurate and personalized insights and recommendations while enabling provision of customized recurring reminder prompts within the work-related applications feed. This reduces user-time spent gathering data from disparate sources while simultaneously improving efficiency and accuracy of analysis and predictive data generation, thereby improving the functioning of the underlying computing device.

The system, in other examples, presents an integrated approach to emotional insights management such that a single user interface is enabled to present predictive insights and recommendations with dynamic data feeds generated based on feedback and inputs obtained from a plurality of work-related applications in real-time to create a unified and seamless user feed that further reduces system resource utilization occurring during manual switching between individual applications running on the computing device, thereby further improving the functioning of the underlying computing device.

Referring now to FIG. 1 an exemplary block diagram illustrating a system 100 for emotional insight management is shown. The computing device 102 represents any device executing computer-executable instructions 104 (e.g., as application programs, operating system functionality, or both) to implement the operations and functionality associated with the computing device 102. The computing device 102 in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 in other examples includes a user interface device 110. The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 8, FIG. 9, FIG. 10, and FIG. 11).

The computing device 102 further has one or more computer-readable media, such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 stores data, such as one or more applications. The applications, when executed by the processor 106, operate to perform functionality on the computing device 102. The applications can communicate with counterpart applications or services, such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface device 114. The communications interface device 114 includes a network interface card and/or computer-executable instructions (e.g., a driver) for operating the network interface card. Communication between the computing device 102 and other devices, such as but not limited to a cloud server 118, can occur using any protocol or mechanism over any wired or wireless connection. In some examples, the communications interface device 114 is operable with short range communication technologies such as by using near-field communication (NFC) tags.

The cloud server 118 is a logical server providing services to the computing device 102 or other clients. The cloud server 118 is hosted and/or delivered via the network 112. In some non-limiting examples, the cloud server 118 is associated with one or more physical servers in one or more data centers. In other examples, the cloud server 118 is associated with a distributed network of servers.

The system 100 can optionally include a data storage device 124 for storing data, such as, but not limited to user-provided data 126 and/or historical data 128. The data storage device 124 can include one or more different types of data storage devices, such as, for example, one or more rotating disks drives, one or more solid state drives (SSDs), and/or any other type of data storage device. The data storage device 124 in some non-limiting examples includes a redundant array of independent disks (RAID) array. In other examples, the data storage device 124 includes a database.

The data storage device 124, in this example, is included within the computing device 102, attached to the computing device, plugged into the computing device, or otherwise associated with the computing device 102. In other examples, the data storage device lxx includes a remote data storage accessed by the computing device via the network 112, such as a remote data storage device, a data storage in a remote data center, or a cloud storage.

In some examples, an insights application 130 outputs a prompt 134 to a user. The prompt 134 includes a question associated with the emotional well-being of the user. The prompt 134, in this example, is displayed within the user interface device 110 at an occurrence of a user-configured prompt time-interval. The prompt includes at least one emotional state depiction, such as, but not limited to, the set of emotional state depictions 122.

An emotional state depiction is an image or word depiction representing an emotional state, whereby a selection of an individual emotional state depiction indicates a current emotional state of a user. In other words, the set of emotional state depictions 122 represent a set of potential emotions or emotional states of the user. The user can select one of the depictions in the set of emotional state depictions as a response to the prompt 134.

In this non-limiting example, the set of emotional state depictions includes a set of two or more emojis, where each emoji represents a distinctive emotional state. In response to the prompt 134, the user selects the indicator which most closely represents the user's current emotional state. The indicator of the user's emotional state is derived from the response. This user's current emotional state indicated by the depiction selected by the user from the set of emotional state depictions is a response which is recorded to create an emotional journaling entry of the user for that day and/or time.

An emotional state depiction, in some examples, is implemented as a pre-defined text description of a mood, word, icon, graphical image, symbol, letter, or any other type of depiction representing an emotion, emotional state or mood. The set of emotional state depictions, in some non-limiting examples, is a set of two or more depictions, such as emojis for example.

Once the user provides data 126 indicating the user's current emotional state in response to prompt 134, data 126 is stored in the data storage device 124 for future usage in determining historical emotional trends over time, insights associated with the user's current emotional state, historical emotional trends, and/or workplace emotional connections, and/or generate personalized recommendations for the user based on the generated insights and analysis.

In this non-limiting example, the user's responses and the generated insights and recommendations are stored on a local data storage device. However, in other examples, the user's responses, insights and/or recommendations are stored in a remote data storage, such as, but not limited to, a cloud storage.

In other examples, the insights application 130 optionally prompts the user to provide additional information regarding the cause or reason for the user's emotional state based on the response received. For example, if the user indicates their emotional state is happy, the system 100 prompts the user to provide additional information as to why the user may be feeling happy today. The user can provide free text answers, or the system can provide pre-defined answer choices for the user to select or other personalized answer choices based on the analysis of historical data, including the user's historical free text answers. In some non-limiting examples, potential reasons for a user to have indicated a happy emotional state may include completing a project, a favorable review, fewer meetings during the day, more focus time to complete tasks, less time spent responding to emails, taking a coffee break, taking time for rest or meditation, booking time for responding to emails, booking time for focus work, etc.

Free text answers in a journal entry include any type of text the user chooses to type into a text field. In some examples, the system merely stores the free text answers linked to the date and time the free text entry was created by the user. The free text entry may likewise be linked to an emotional response depiction representing the user's mood at the time the entry was created. In these examples, the free text entries may be provided to the user on demand to assist the user in recalling the reason for their mood on a given day. However, the free text answers are not used for generating insights or recommendations.

The system, in other examples, analyzes the free text answers provided by the user using a machine learning language model capable of analyzing text entries or natural language speech of a user to identify the subject of the free text answers. In these examples, the free text answers are analyzed using the machine learning model and the free text answers are categorized or linked to pre-defined keywords based on the analysis results. In this manner, the free text answers may be used to generate insights and/or recommendations.

In still other examples, the system analyzes the user-provided data 126 along with historical data 128 and work-related data obtained from collaborative work-related applications 132. The historical data 128 in these examples includes the user's previous emotional state responses recorded and saved in the data storage device 124 or another database. The historical data 128 can include, without limitation, data such as historical emotion response data 218 shown in FIG. 2 below.

The collaborative work-related applications 132, in some non-limiting examples, include one or more applications on the same platform as the insights application 130. In these examples, the insights application 130 works across desktop, web, and mobile end points giving users the option to reflect and be aware of their emotions throughout the workday within their collaborative work-related productivity application(s). The integration enables the system to understand the user's entire workday and make more informed inferences and predictions with regard to insights and recommendations.

The work-related applications 132, in other examples include, without limitation, calendaring applications, chat, video conferencing applications, email applications or any other type of work-related applications. The insights application 130 utilizes data from these work-related applications 132 to correlate the user-provided emotional state data with work-related events that may have influenced the user's emotional state.

In some examples, the insights application analyzes the work-related data with the current and previous emotional state data and any user-provided reasons for the user's emotional state to generate customized insights and recommendations for the user based on predictive insights. The system correlates emotional history and journal responses, with workplace/collaboration data to infer causes of emotional state, and then generates an insight based on these system-generated inferences In some examples, the work-related data obtained from the work-related applications enables the system to provide the user with insights taking into account work-related events and work-related influences on user well-being and emotions.

An insight is a reason or potential cause for a user's current or previous emotional state recorded within the insights application. An insight may include an event or series of events resulting on the user's current mood or emotional trend over a given period of time. For example, an insight might indicate that the user's sad mood today is due to having a shorter amount of focus time to complete tasks than is typical for the user. In other examples, an insight associated with a trend of several days during which the user records an unpleasant mood can indicate an unusually larger number of after-work-hours emails as a potential cause of the trending negative mood.

A recommendation is a set of one or more recommended actions to be taken by the user in response to the user's indicated current emotional state. If the user reported a negative mood, the recommendation includes one or more recommended actions to mitigate the negative mood. A mitigating action can include a recommendation to meditate, perform breathing exercises, stretch, take a walk, block time for focus time to complete a task or any other action which might tend to improve the user's emotional well-being.

The system, in other examples, provides one or more selectable user interface elements for performing these recommended action and processes. For example, if the user selects a depiction or other icon indicating a negative mood, the system presents a list of recommended actions for improving the user's mood, such as scheduling time for focus work for example. Embedded within the list or displayed within proximity to the list of recommended actions, the system presents an icon or other selectable element which the user can select a recommended action, such as an action to enable booking time for focus work in the user's calendar application. If the user clicks the selectable element, the calendar application automatically opens enabling the user to book focus work time in their calendar, in this example.

In this manner, the graphical user interface provides additional functionality enabling faster and more efficient implementation of recommended actions in an automated fashion. The emotional journaling application automatically links to other applications, such as the calendaring application, to assist the user with carrying out one or more of the recommendations.

If the user indicates their current emotional state is a positive mood, the system 100 may recommend an action to further improve the user's mood or otherwise take an action in accordance with that positive mood. In some examples, a recommendation can include sending a thank you or kudos to a coworker or supervisor which may have done something to contribute to the user's positive mood. In another example, if an insight indicates a positive mood is due to getting more time for focus work today, the system may recommend the user block time in their calendar for more focus work time tomorrow.

In still other examples, if the insights indicate the user has not had recent meeting with a manager or supervisor, the system may output an insight suggesting negative emotional state may be due to losing touch with the manager. The recommendation in this case can include a suggested action to schedule a meeting or other one-on-one time with the manager.

Thus, in some examples, the system 100 provides a well-being journaling application that helps users with emotional awareness at work through emotion journaling, well-being insights and recommendations. In other examples the system 100 uses an emotional response capturing system which prompts the user with a question around their emotional well-being and provides the user a way to record their response. It provides users with passive and active insights so that they can better manage their emotions. The system determines the kind of assistance to be offered based on how the user is feeling (based on users' response) and based on algorithms with rich understanding of the user's workday and collaboration within productivity work-related applications ecosystem. The system 100 provides technical capability to journal and track emotional well-being over time, integrated in productivity tools. The system 100 further provides customization to enable the user to set their own frequency (time and day of work week) of emotional check in and the technical capability to notify user based on the user's selected frequency from within a productivity or collaboration tool to help build a habit of emotional awareness. The system provides deep integration with the rest of the collaboration signals of a user to provide personalized insights around potential causes which might be impacting emotional well-being and solutions to improve emotional well-being.

The insights application, in some non-limiting examples, provides a tool for achieving emotional awareness at work. The application integrates the emotional awareness insights application with productivity/collaboration work-related applications. In other examples, the insights application 130 determines the user's emotional state via questions displayed to the user via the user interface and the answers provided by the user. The application provides the user with insights related to his/her emotional well-being. The insights application provides suggestions to the user regarding how to improve the emotional well-being based on the current emotional state. It further combines emotion values with collaboration/productivity signals and allows the user to customize and set frequency of emotion check-in.

In some examples, the automation of the recurring reminder prompts enables the insights application to reach out on a regular basis to remind the user to take a quick pulse check on how the user is feeling. The automation enables the system 100 to track a user's feelings/emotional state, journal it and consistently correlate that information with other work-related data and inferred well-being signals on a recurring basis. In this manner, the system correlates and personalizes recommendations using productivity data, collaboration data with workplace data and emotional history data to diagnose emotional state. The system identifies causes of emotional state and assists a user to improve their emotional state.

Figure 2:
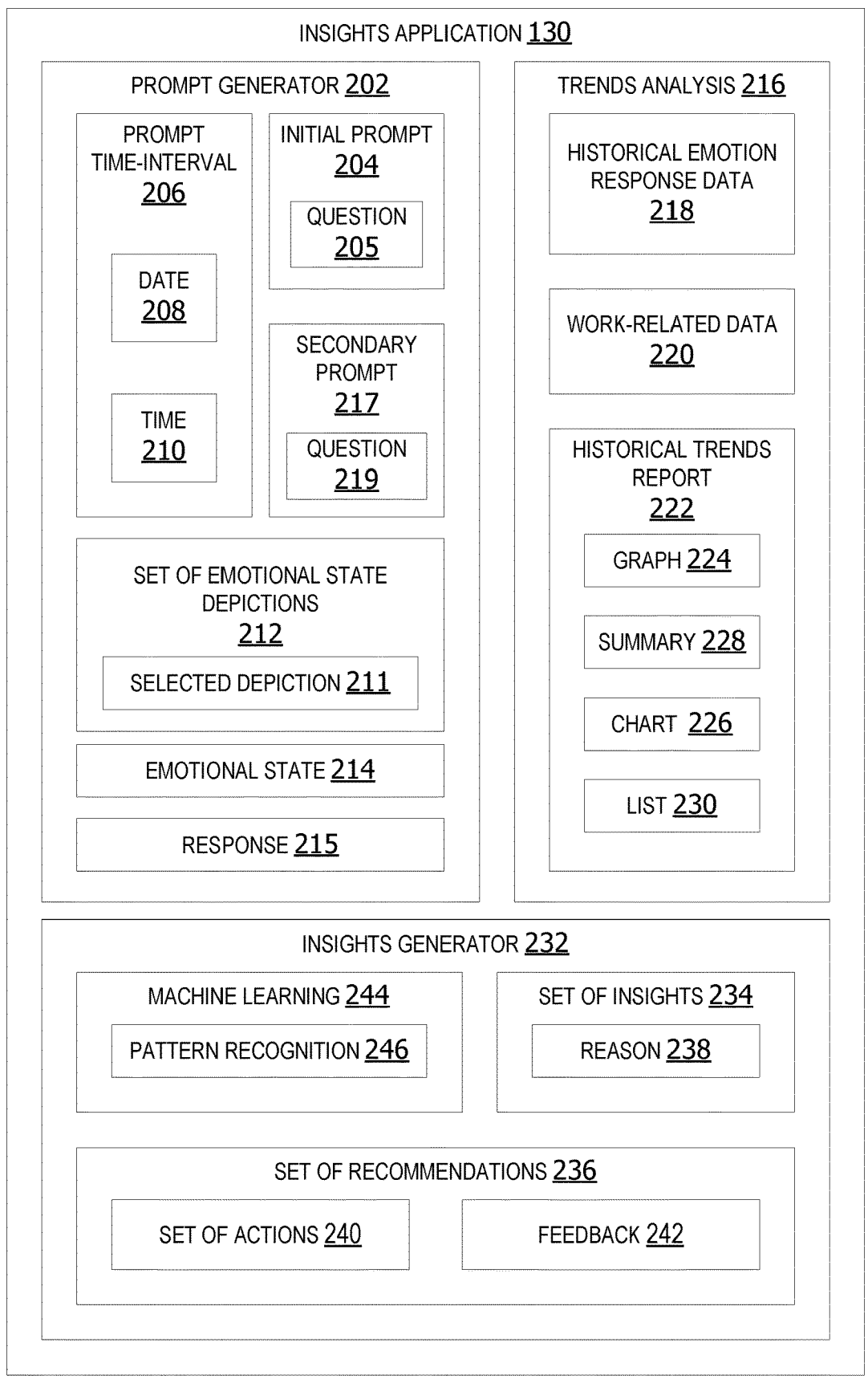
FIG. 2 is an exemplary block diagram illustrating a well-being insights Application.

FIG. 2 is an exemplary block diagram illustrating a well-being insights application 130. In this example, the insights application 130 includes a prompt generator 202. The prompt generator 202 is a software component which generates an initial prompt 204. The initial prompt is a prompt, such as, but not limited to, the prompt 134 in FIG. 1.

The initial prompt 204 includes a pre-defined question 205 associated with the user's emotional well-being. The pre-defined questions are intended to illicit a response from the user indicating the user's current emotional state. In this example, the user responds by selecting an emotional state depiction from a set of emotional state depictions presented to the user with the pre-defined questions.

The initial prompt 204, in some examples, is presented to the user at a user-configured time, or an initially pre-configured (default) interval until personalized by the user. In other examples, the initial prompt 204 is presented to the user once prior to the user setting up a personalized recurring reminder prompt time-interval. If the user fails to set up the personalized prompt time-interval, the initial prompt is not re-presented to the user again until the user does choose to set up recurring reminders.

The prompt time-interval is a customized, user-configured time-interval at which a recurring reminder is presented to the user. The time-interval includes a user selected date 208 and/or time 210 for the next prompt. In other examples, the prompt time-interval can include multiple dates and/or times. For example, a user can select to receive a prompt every weekday (Monday through Friday) at 4:00 p.m. In this example, a prompt is presented to the user at 4:00 p.m. on Monday, Tuesday, Wednesday, Thursday, and Friday.

The time-interval can also include a time span rather than a specific date. For example, the time-interval can a twenty-four-hour time span rather than a specific day of the week or time of day. The time span is not limited to a twenty-four-hour time span. In other example, the time span can be forty-eight hours, twelve hours, or any other user-configurable time span.

In some examples, the initial prompt 204 includes a set of emotional state depictions 212 to obtain and record an emotion response 215 indicating an emotional state 214 of the user. The set of emotional state depictions 212 is a set of two or more depictions representing two or more emotional states, such as, but not limited to, the set of emotional state depictions 122 in FIG. 1.

The response 215, in this example, is made by the user selecting one of the emotional state depictions in the set of emotional state depictions 212 displayed within the user interface. The selected depiction 211 is the depiction most closely representing the user's current emotional state. The emotional state represented by the selected depiction 211 is utilized to derive the user's response. That response is recorded as a journal entry describing the user's emotional state for the date and/or time at which the user selects the depiction from the set of emotional state depictions 212.

Once the user has recorded their initial response, depending on the response type, the insights application sends a secondary follow-up question. The follow-up question can be either a pre-defined question or a question personalized for the user based on the user-specific history data and user-provided feedback data.

In some examples, the insights application suggests an additional follow-up question to help the user understand the cause behind the way they are feeling. Any response provided by the user to the follow-up question is added to the user's emotional tracking journal. For example, if the user responded to the initial prompt question by selecting a depiction indicating the user is feeling unhappy, the secondary prompt follow-up question encourages the user to add a possible cause for the negative mood, such as not enough sleep, feeling hungry or stressed. This assists the user in pinning down the reason behind their emotional state and then enables the user to work on improving their well-being.

In the example above, the follow-up question is presented depending on the response type, such as, but not limited to, only presenting follow-up questions where the current emotional state is negative (sad or angry) or where the user's emotional state has changed after remaining fairly consistent for some period-of-time. For example, if the user reports feeling happy every day for four days in a row, no follow-up questions are provided with the secondary prompt until the user reports feeling sad of the fifth day.

The system 100, in other examples, always outputs a secondary prompt 217, including the follow-up question 219, in response to receiving a user selection of an emotional state depiction rather than only presenting the secondary prompt where additional information associated with a negative emotional state is desirable. The secondary prompt 217 presents the follow-up question as a request for additional information associated with the user's indicated emotional state 214, whether that emotional state be a positive, negative, or neutral emotional state. The additional information can include a more detail description of the user's well-being or emotions. The additional information, in other examples, can include any information on events or occurrences during the day that may have impacted the user's response 215.

In some examples, the follow-up question included in the secondary prompt is a question such as, but not limited to, "Did you not have time for lunch today?" In another example, the follow-up question may include a question such as, "Did you sleep well last night?" or "Did you have any focus time today/this week?" These types of questions are intended to prompt the user to provide additional relevant information which may be useful in generating insights into reasons for the user's current emotional state, generating recommendations to assist the user in managing their emotional state and/or generating recommendations to assist the user in improving their well-being/mood.

A trend analysis 216 is a software component, in other examples, that analyzes historical emotion response data 218 provided by the user and work-related data 220 obtained from a one or more collaborative work-related applications. The historical emotion response data 218 is data recording past emotion response data provided by the user in the past, such as on previous days.

The work-related data is data indicating events and activities associated with the user's workday. Work-related data may include the amount of time the user spent responding to emails, the amount of focus time the user spent on work, the time spent in meetings, the time spent in phone calls or video conferencing, overtime/afterhours work, etc. The trends analysis 216 analyzes this historical data and work-related data to generate a personalized historical trends report 222.

A historical trends report 222, in some examples, is a presentation of historical emotion response data during a selected time-period. The historical trends report 222 further includes generated insights associated with each historical emotional state reported by the user. An insight is a prediction generated by the insights application regarding potential causes or reasons for each historical emotional state of the user. The information in the historical trends report 222 may be presented in a variety of formats. In some examples, the historical trends report 222 includes information presented within a graph 224, a summary 228, a chart 226, a list 230 or any other format.

In other examples, an insights generator 232 generates a set of one or more insights 234 and/or a set of one or more recommendations 236 associated with the current emotional state of the user. A set of one or more insights 234 includes at least one potential reason 238 for the current emotional state of the user. The potential reason in some examples is a predicted reason. The set of recommendations 236 including a set of one or more actions 240 which may be taken by the user to improve the user's mood or overall well-being.

In some examples, the system displays the set of insights 234 and/or the set of recommendations 236, including a set of one or more actions 240 to be taken by the user in response to the current emotional state of the user. The system prompts the user to provide feedback 242 regarding whether the insights and/or recommended actions were helpful to the user. The feedback, in some examples, is utilized by a machine learning 244 analyzes to refine and improve generated insights and recommendations customized for the user.

In some non-limiting examples, the machine learning 244 analyzes the feedback 242 along with pattern recognition data 246 to generate and/or further refine the generated set of insights 234 and/or the set of actions 240 provided in each recommendation. The set of actions a given recommendation are customized for the user based on the historical data and user-provided feedback. The machine learning 244 utilizes artificial intelligence and/or machine learning modeling to improve the accuracy and relevance of the insights and recommendations based on the user's feedback over time.

In this example, the historical trends report is a confidential (private) user level report personalized for the user. The system does not reveal the user's emotional responses data, emotional state, insights, or recommendations to anyone, but the user associated with the insights application providing the response data. In other words, the system provides a user-level historical trends report that is made available only to the user creating the emotional response data. The user level report enables the user to build a habit of mindfulness and become more aware of their emotional state to assist the user with self-care and improve overall emotional well-being.

In other examples, the historical trends report is not limited to the user level. Instead, the system can also generate an anonymized team level report and/or an anonymized organization level report. The team level report is a report containing contains anonymized and generalized data associated with a group of people or a team provided to a manager of the group or team. The team level report is not available to individual team members. The information within the team level report permits a manager to obtain a high-level, emotional overview associated with the well-being of the team, as a whole. For example, the team level report may indicate that all members of a team report a positive overall emotional state a majority of the time over the last month. This type of report lacks any identifying information or user-specific information associated with individual team members so as to protect the anonymity and privacy of individual users. The team-level report can be used to improve the managers performance while providing for the well-being and needs of the group as a whole rather than focusing on the emotional mindfulness of a specific user.

The organizational level report, in some examples, is an anonymized and generalized report generated for a business division head to permit the business division head to monitor the general well-being of the plurality of people within a business division. The information in the team level and organization level is anonymized and aggregated from a plurality of users such that the information provided cannot be identified with a specific user. For example, the organization level report can include generalized and anonymized information such as, seventy-five percent of personnel within a given division report overall positive feelings associated with work a majority of the time.

Figure 3:
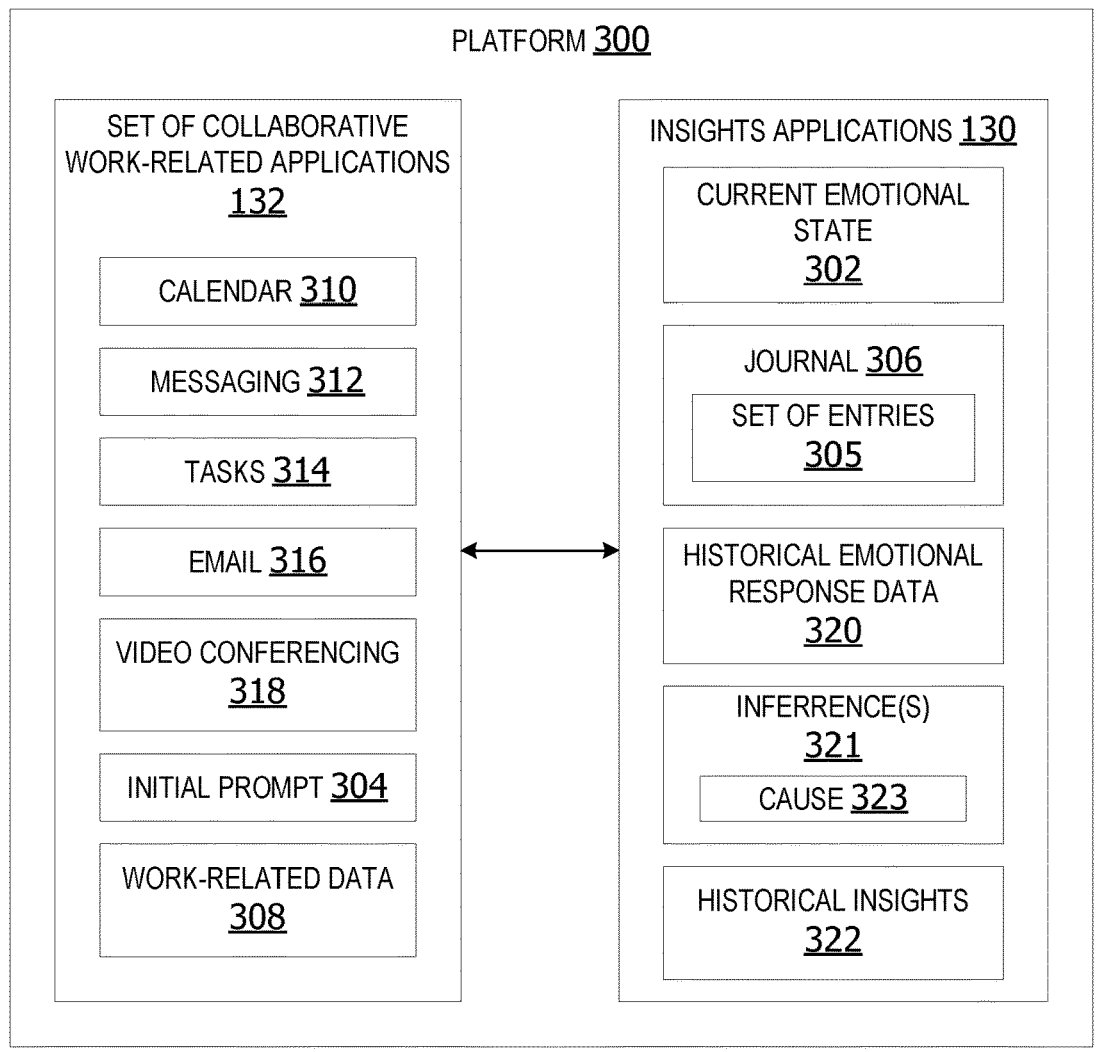
FIG. 3 is an exemplary block diagram illustrating a platform hosting a one or more collaborative work-related applications and a well-being insights application.

FIG. 3 is an exemplary block diagram illustrating a platform 300 hosting a set of one or more collaborative work-related applications 132 and a well-being insights application 130. The insights application 130 in some examples notifies the user to provide a response indicating a current emotional state 302 by displaying an initial prompt 303 within a collaborative work-related application in the set of collaborative work-related applications 132. The current emotional state is a contemporary or real-time emotional state of the user. The emotional state describes an emotional condition or well-being of the user, such as, but not limited to, the emotional state 214 in FIG. 2. The initial prompt 303 is a prompt, such as, but not limited to, the prompt 134 in FIG. 1 and the prompt 204 in FIG. 2.

The system transmits the initial prompt to a user interface device at a default time interval until the user chooses to configure a recurring prompt time-interval or until the system learns a better time to prompt the user as it personalizes the prompts to the user. In some non-limiting examples, the default time-interval is four o'clock in the afternoon every weekday. However, the examples are not limited to this default prompt time. In other examples, the default prompt time can be set to any day and/or time selected by a user.

The prompt 304 includes a link back to the well-being insights application 130 which enables the user to enter emotional response data into an electronic journal 306. The journal 306 is an electronic insights journal containing a set of one or more entries 305 created by a user. The entries 305 include the emotional response data corresponding to an emotional state represented by an emotional state depiction selected by the user on a given date and/or time. The entries 305 include an identification of the emotional state and the data/time each entry was created. The entries 305 also include generated insights corresponding to each emotional state and/or recommendations associated with each emotional state. In some examples, an entry also includes work-related information for the day the entry was created, such as, but not limited to, hours spent in meetings, hours spent in focus work, hours spent responding to emails, etc.

The set of collaborative work-related applications 132 is a set of one or more work-related applications on a common platform 300 sharing work-related data 308 with the insights application 130. The work-related data is data such as, but not limited to, the work-related data 220 in FIG. 2.

The set of collaborative work-related application 132 includes applications, such as, but not limited to, a calendar 310 application, a messaging 312 application, a tasks 314 managing application, an email 316 application, a video conferencing 318 application and/or any other type of work-related application.

In some examples, the insights application 130 analyzes the current emotional state 302 of the user, historical emotional response data 320, historical insights 322 associated with historical emotional states of the user and/or the work-related data 308 for the date corresponding to the date of the current emotional state 302 of the user. The insights application 130 generates one or more inference(s) 321 as to at least one cause 323 of the current emotional state of the user by correlating the historical emotion response data with the work-related data obtained from the set of collaborative work-related applications. The insights application generates one or more insights associated with the current emotional state of the user and/or a set of recommendations to improve the user's emotional state based on the inferred cause(s) of the current emotional state of the user, the one or more insights including at least one potential reason for the current emotional state of the user, wherein the one or more insights are presented to the user via the user interface device. The analysis results, including the inferences and data correlation results are utilized to generate new insights, recommendation(s), and/or historical trends reports customized for each user.

Figure 4:
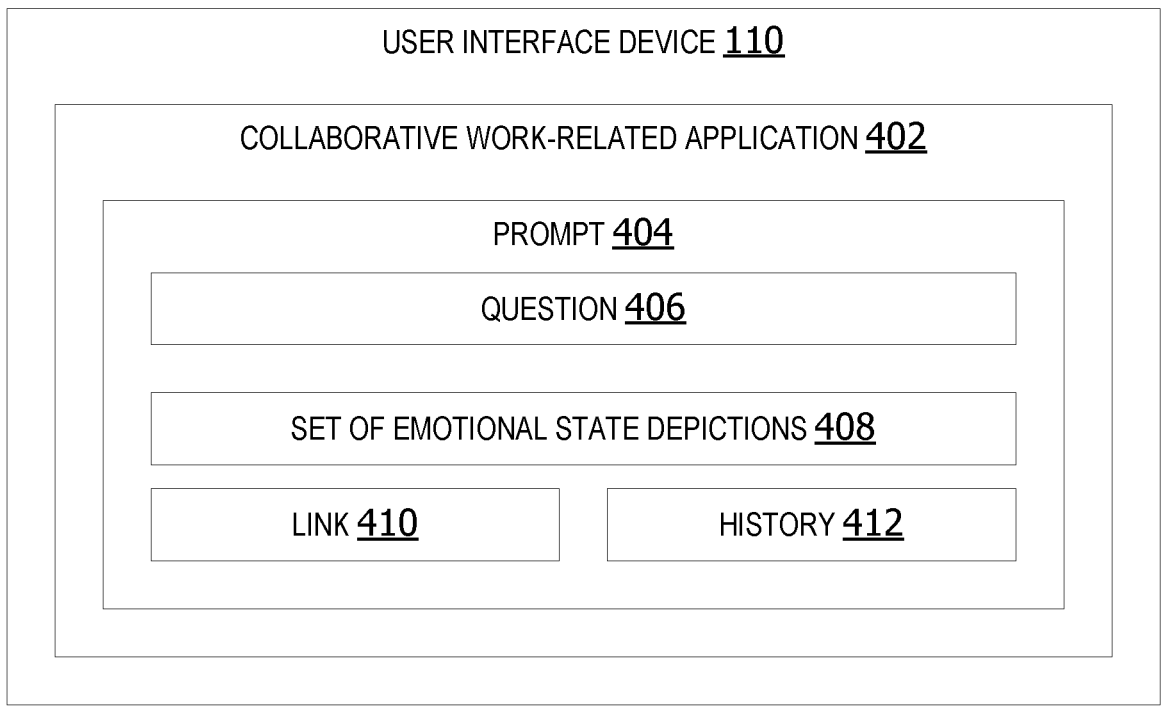
FIG. 4 is an exemplary block diagram illustrating a user interface device displaying a collaborative work-related application including a customized well-being journaling prompt.

FIG. 4 is an exemplary block diagram illustrating a user interface device 110 displaying a collaborative work-related application 402 including a customized well-being initial prompt 404 to encourage the user to make an entry in the well-being journal. The initial prompt 404 is a prompt, such as, but not limited to, the prompt 134 in FIG. 1, the prompt 204 in FIG. 2, and/or the prompt 303 in FIG. 3.

The initial prompt 404 includes a question 406 and a set of emotional state depictions 408 used to obtain emotional response data from the user. The set of emotional state depictions 408 is a set of two or more depictions representing two or more emotional states, such as, but not limited to, the set of emotional state depictions 122 in FIG. 1 and the set of emotional state depictions 212 in FIG. 2.

In this non-limiting example, the prompt 404 is initially displayed to the user within a collaborative work-related application 402. The user selects an indicator in the set of indicators displayed on the user interface to indicate the user's current emotional state without leaving the collaborative work-related application 402. For example, if the collaborative work-related application is a calendar application or a feed containing display data from multiple work-related application, the prompt 404 is displayed within the calendar application display or the multiple work-related application workspace in the user interface. The question 406 in some examples is a question associated with the user's well-being. In some non-limiting example, the question says, "How was your day today?" In other non-limiting examples, the question says, "How is your day going so far?" In still another example, the question says, "How are you feeling now?"

In other examples, the user can select a link 410 to open the insights application if the user wishes to view historical trends, provide additional information, or otherwise utilize other functions within the insights application. In another example, a history tab 412 is selected by the user to open a historical trends report within the insights application.

Figure 5:
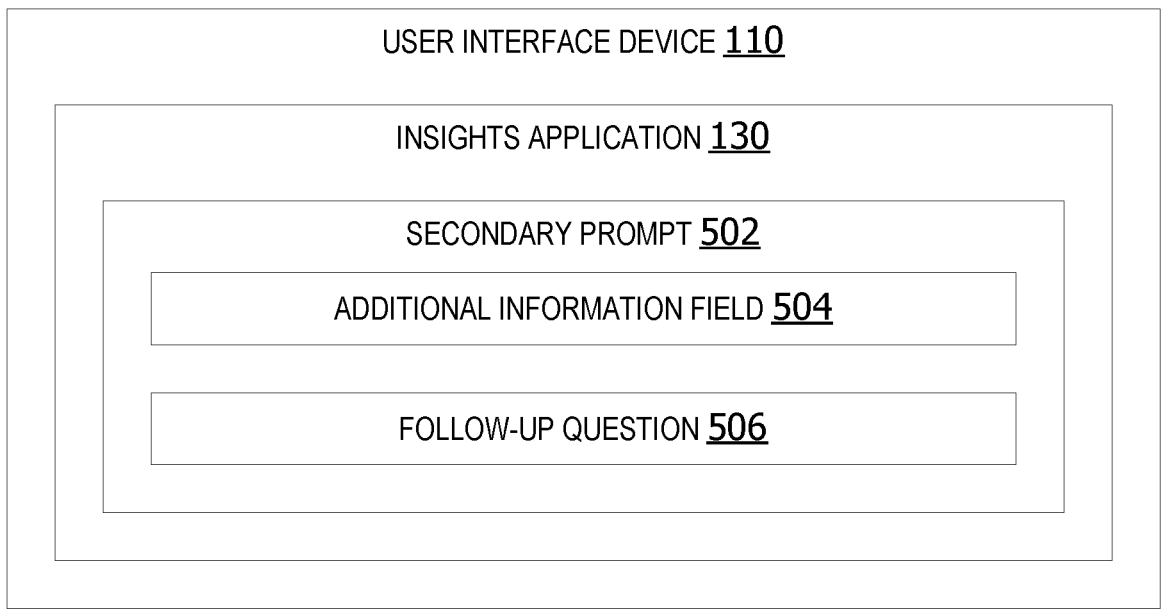
FIG. 5 is an exemplary block diagram illustrating a user interface device displaying an insights application including a secondary prompt.

FIG. 5 is an exemplary block diagram illustrating a user interface device 110 displaying an insights application 130 including a secondary prompt 502. The secondary prompt is a prompt including a follow-up question, such as, but not limited to, the secondary prompt 217 in FIG. 2. The secondary prompt 502 provides an additional information field 504 in which the user can enter additional information associated with the user's current emotional state and/or any other information associated with the user's mood.

This activity of recording the user's emotional state and possible reasons for the emotions improves the user's emotional intelligence. Employees with high emotional intelligence create higher teamwork effectiveness. There is a positive relationship between emotional abilities and job performance. Setting aside fifteen minutes to reflect at the end of the workday can significantly improve employee's performance, productivity, and impact.

Figure 6:
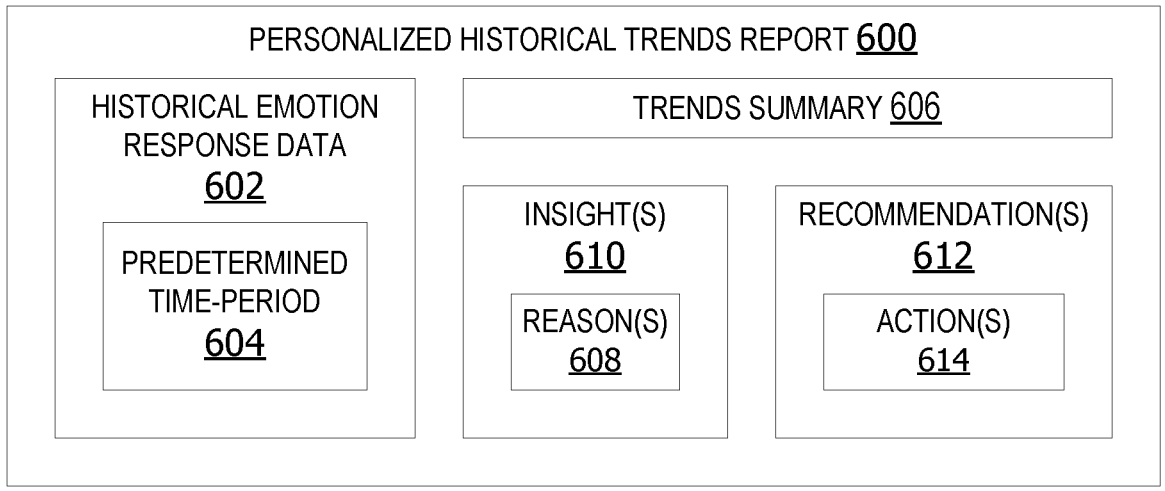
FIG. 6 is an exemplary block diagram illustrating an historical trends report.

FIG. 6 is an exemplary block diagram illustrating an historical trends report 600. The historical trends report 600 includes historical emotion response data 602 provided by the user during a predetermined time-period 604. The historical emotion response data 602 is data such as, but not limited to, the historical data 128 in FIG. 1 and the historical emotion response data 218 in FIG. 2. In some non-limiting example, the historical trends report 600 includes a trends summary 606 summarizing trends in the user's indicated emotional state over time.

The historical trends report 600 in some non-limiting examples can include historical insight(s) 610, including one or more reason(s) 608 associated with each historical emotional state. The one or more reason(s) 608 includes at least one reason, such as, but not limited to, the reason 238 in FIG. 2. The historical trends report 600 can also optionally include one or more recommendation(s) 612, including one or more suggested action(s) 614 for the user. The suggested actions include one or more recommended actions, such as, but not limited to, the set of actions 240 in FIG. 2.

The recommendations(s) 612 include one or more recommendations, such as, but not limited to, the set of recommendations 236 in FIG. 2. The historical trends report 600 in other examples provides the historical emotion response data with a date and/or time associated with each historical emotional state described in the historical emotion response data 602.

In some examples, all user emotional check-in response is only available to the user that created/entered the data. No other users, managers, administrators, or other personnel have access to the private emotion journaling data, insights and/or recommendations data generated for the user. Every data point user enters or sees is private. In other examples, the system displays a privacy prompt/disclaimer within the user interface that says information provided by the user is private. There is an information icon which the user can click on for more information regarding the privacy policies.

Figure 7:
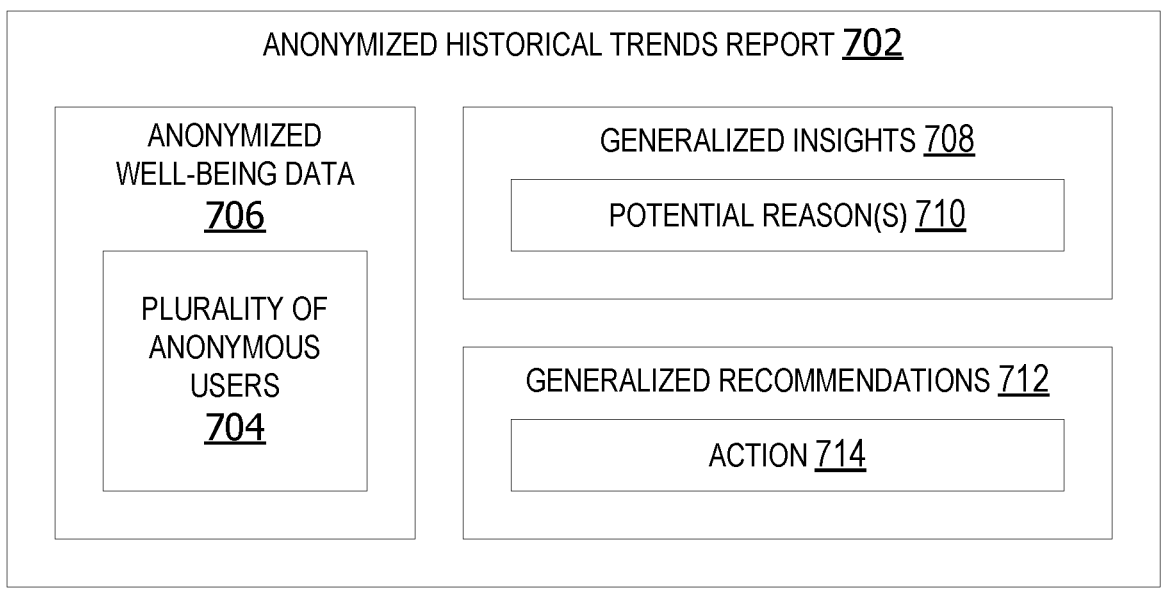
FIG. 7 is an exemplary block diagram illustrating an anonymized historical trends report.

FIG. 7 is an exemplary block diagram illustrating an anonymized historical trends report 700. The anonymized historical trends report 700 is a report providing anonymized well-being data 706 associated with a plurality of anonymous users 704. The anonymized well-being data 706 does not include data specific to a single user. Instead, the anonymized well-being data 706 is data indicating generalized trends in well-being or emotional state associated with groups of users or multiple members of a team, where the anonymized well-being data 706 is not personalized to a single user.

In a non-limiting example, if five out of ten users in a team are indicating a negative emotional state, the anonymized historical trends report 702 indicates fifty percent of the members of the team are trending a below average emotional state. In another example, if ten out of twelve team members are reporting very positive emotional state, such as a happy or fantastic state, the anonymized historical trends report 702 can include a generalized statement that a majority of team members report positive well-being.

The anonymized historical trends report 702 in some non-limiting examples includes generalized insights 708 identifying potential reason(s) 710 for the generalized emotional state of the plurality of users. The potential reason(s) 710 include at least one reason, such as, but not limited to, the reason 238 in FIG. 2 and/or the one or more reason(s) 608 in FIG. 6. In other non-limiting examples, the anonymized historical trends report 702 includes generalized recommendations 712, such as, but not limited to, a suggested action.

For example, if four out of five team members are trending a negative emotional state and all team members are spending extra time responding to after-work emails a majority of the days in the workweek, the generalized insights 708 suggests a reason could be related to the after-work hours emails. The generalized recommendations in this example can include a recommendation to limit or cease after-work hours emails to improve general well-being.

In some examples, the anonymized historical trends report 702 is only generated for a group or team, if the number of users in the group or team exceeds a minimum threshold number. The threshold can be any user-configured threshold value. In one example, the minimum threshold number is ten users. If there are less than ten users, a sufficiently anonymized historical trends report may not be possible while still maintaining privacy and anonymity of the individual members of the group or team. However, the threshold is not limited to a value of ten. The minimum threshold number can include any user-configured number of users. In some examples, the threshold number is five or more. In other examples, the threshold value is eight or more.

In other examples, if a manager wants to stay in touch with team members, the manager can trigger a survey, pulse check-in via the insights application. In these examples, the manager selects an option to send a well-being survey to a single user or a group of users in a team. The survey is a pulse check-in which notifies the user receiving the survey that the survey results are being sent back to the requesting manager. In this manner, the user is aware that the emotion check-in survey they are responding to is not private but is being prepared for the manager. In some cases, the check-in survey may include an opt-out feature if the user does not wish to participate.

In the above examples, the check-in feature includes a prompt and a question asking survey recipients how they are feeling. The question can include queries such as, but not limited to, "How productive are you feeling?" and/or "Do you feel stressed out?" The user knows this is for the manager to see. This is a manager-driven check-in.

In other examples, the check-in is sent automatically from the insights application to the manager recommending the manager reach out to team members other supervised users in response to work-related data indicating the manager has not had recent one-on-one contact with one or more team manager. In such cases, the application analyzes work-related data for the manager and determines whether the manager is losing touch with other team members. In these examples, a prompt sent to the manager indicates the manager needs to schedule time to meet with or otherwise contact team members. These prompts would not include any personal user emotion-related data. The prompt indicates recommended actions based on generalized and anonymized data for the team members.

The insights application, in other examples, notifies a manger if there is a trend holistically impacting the whole team, such as, but not limited to, where 60% of team is working after hours and feeling low over the past weeks, that could be an example where a prompt is sent to the manager recommending the manager reach out to team members. However, these prompts would not include any personalized or non-anonymized information as the user's privacy with regard to their emotion journaling is always protected.

In still other examples, the system compares anonymized emotion data for one team with other similar teams to compare and analyze well-being trends among similar groups and/or groups doing similar work. This can assist managers in identifying problems and/or taking recommended actions to improve overall team moral and well-being.

Figure 8:
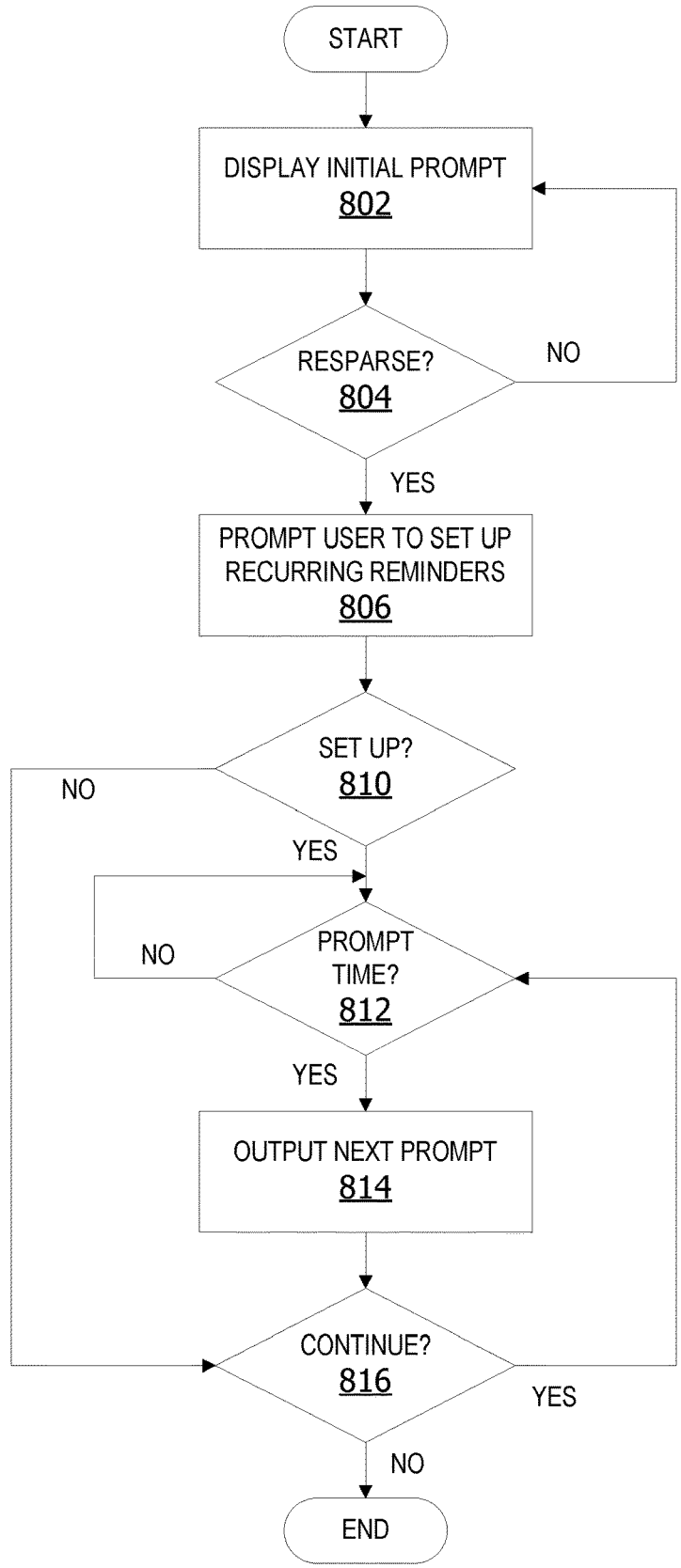
FIG. 8 is an exemplary flow chart illustrating operation of the computing device to set up personalized well-being journaling prompts.

FIG. 8 is an exemplary flow chart illustrating operation of the computing device to set up personalized well-being journaling prompts. The process shown in FIG. 8 is performed by an insights application, executing on a computing device, such as the computing device 102 in FIG. 1 and/or the computing device 2200 of FIG. 22.

The process begins by displaying an initial prompt at 802. The prompt is displayed within a user interface, such as the user interface device 110 in FIG. 1. A determination is made whether a response is received from the user at 804. A response is received if the user selects an emotional state depiction in the set of indicators presented to the user with the prompt. If yes, another prompt is presented to the user prompting the user to set up recurring reminders at 806. The prompt is displayed within the user interface. The user sets up the recurring reminder by selecting a prompt time-interval. The time-interval includes one or more days and/or times or time spans. A determination is made whether the user sets up the recurring reminders at 810. If yes, a determination is made whether the prompt time is reached at 812. If yes, the next prompt reminding the user to enter emotional awareness data is output at 816. A determination is made whether to continue at 816. If yes, the process iteratively executes operations 812 through 816 until a determination is made to discontinue at 816. The process terminates thereafter.

While the operations illustrated in FIG. 8 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 8.

Figure 9:
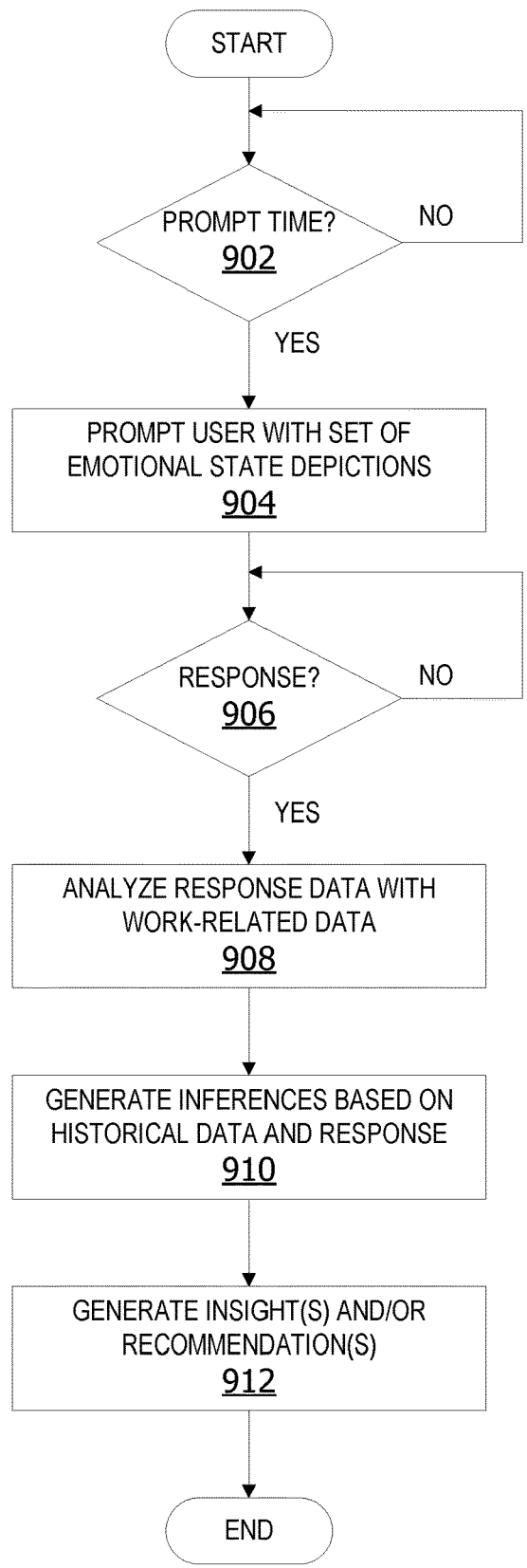
FIG. 9 is an exemplary flow chart illustrating operation of the computing device to provide well-being prompts and insights to a user.

FIG. 9 is an exemplary flow chart illustrating operation of the computing device to provide well-being prompts and insights to a user. The process shown in FIG. 9 is performed by an insights application, executing on a computing device, such as the computing device 102 in FIG. 1 and/or the computing device 2200 of FIG. 22.

The process begins by determining whether a user-configured time to present a recurring reminder prompt is reached at 902. If yes, a prompt with a set of emotional state depictions is presented to the user at 904. A determination is made whether a response is received from the user at 906. If yes, the response data is analyzed with work-related data at 908. One or more inferences regarding the causes of the current emotional state of the user are generated by correlating the historical emotion response data with the work-related data obtained from the set of collaborative work-related applications at 910. A set of one or more insights and/or recommendations are generated based on the inferences at 912. The process terminates thereafter.

While the operations illustrated in FIG. 9 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 9.

Figure 10:
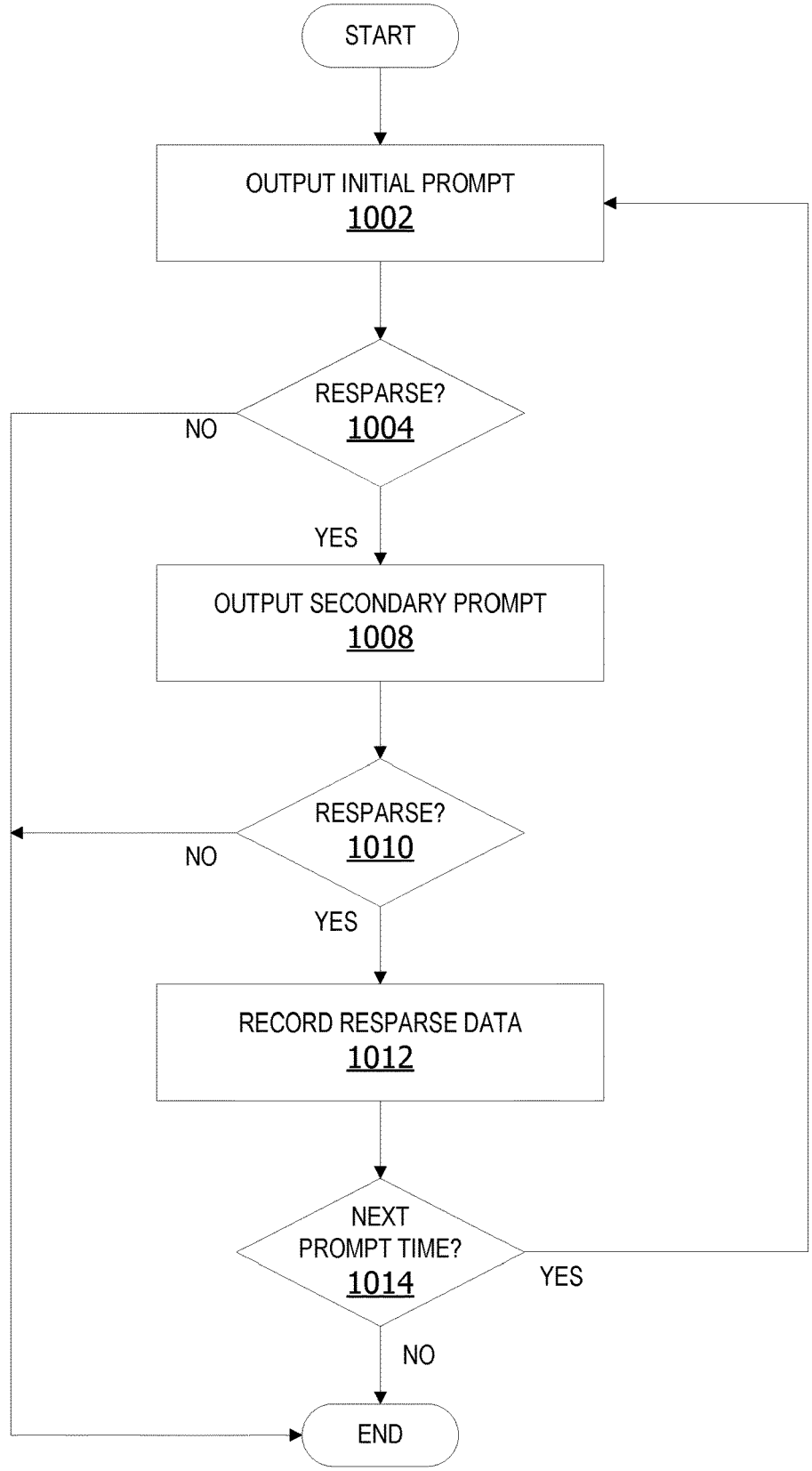
FIG. 10 is an exemplary flow chart illustrating operation of the computing device to output an initial prompt and a secondary prompt.

FIG. 10 is an exemplary flow chart illustrating operation of the computing device to output an initial prompt and a secondary prompt. The process shown in FIG. 10 is performed by an insights application, executing on a computing device, such as the computing device 102 in FIG. 1 and/or the computing device 2200 of FIG. 22.

The process begins by outputting an initial prompt at 1002. A determination is made whether a response is received from the user indicating a current emotional state of the user at 1004. If yes, the response is recorded at 1006. In some examples, the response data is recorded in a database or data store, such as, but not limited to, the data storage device 124 in FIG. 1.

A secondary prompt is output at 1008. The secondary prompt encourages the user to provide additional information describing the user's current emotional state and/or potential causes of the user's current emotional state. A determination is made whether the user enters a response to the secondary prompt at 1010. If yes, the response data is recorded at 1012. A determination is made whether a next prompt time is reached at 1014. The next prompt time is the recurring prompt time-interval set by the user. If yes, the process iteratively executes operations 1002 through 1014 until there is no remaining next prompt time. The process terminates thereafter.

While the operations illustrated in FIG. 10 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 10.

Figure 11:
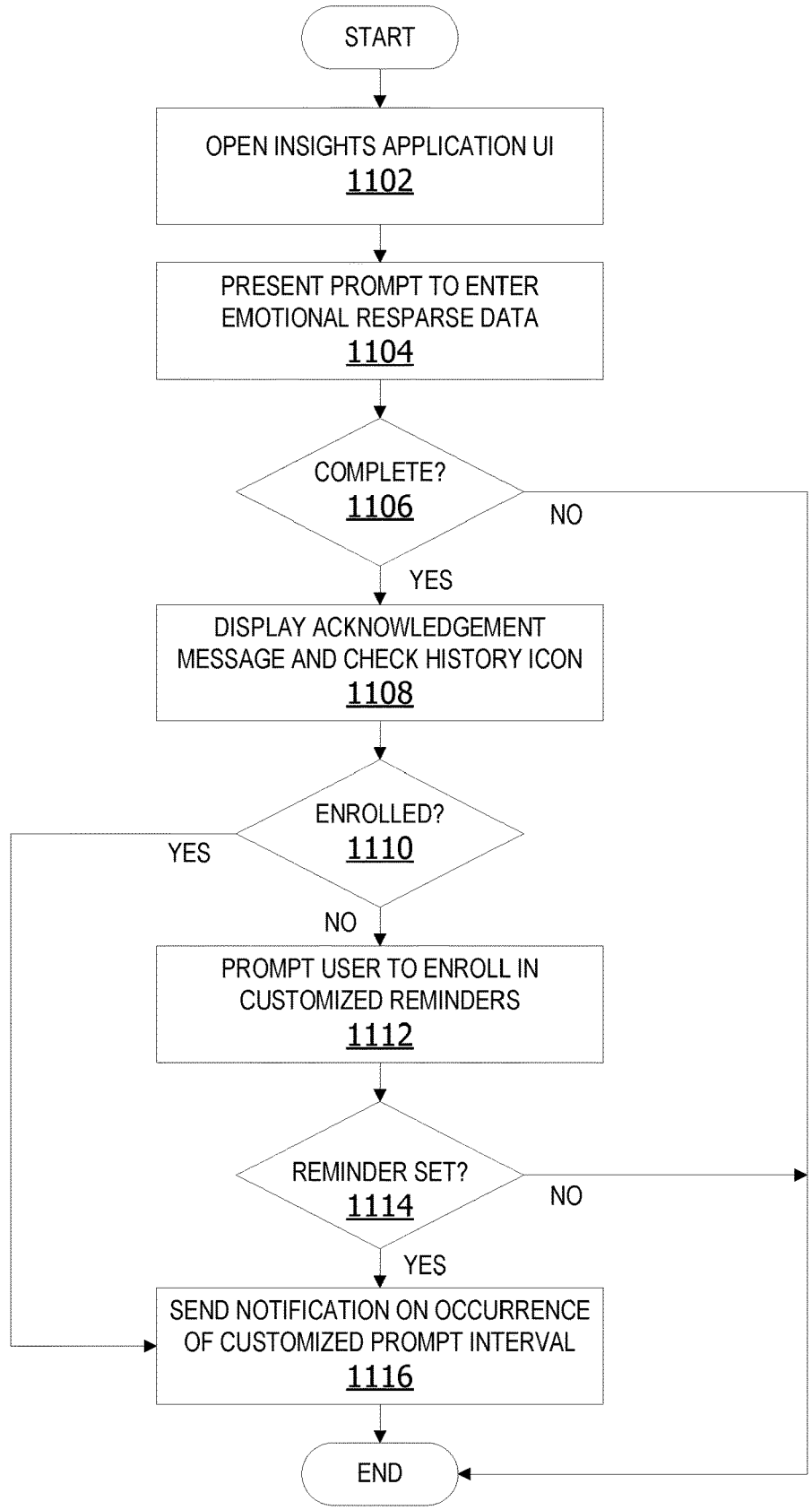
FIG. 11 is an exemplary flow chart illustrating operation of the computing device to setup an automatic emotion journaling reminder.

FIG. 11 is an exemplary flow chart illustrating operation of the computing device to setup an automatic emotion journaling reminder. The process shown in FIG. 11 is performed by an insights application, executing on a computing device, such as the computing device 102 in FIG. 1 and/or the computing device 2200 of FIG. 22.

The process begins by opening an insights application user interface at 1102. A prompt to enter emotional response data is presented to the user via the user interface at 1104. A determination is made whether the user has completed entry of response data at 1106. If yes, an acknowledgement message and check history icon is displayed at 1108. A determination is made whether the user is enrolled for recurring reminders at 1110. If no, a prompt is displayed encouraging the user to enroll to receive customized reminders at 1112. A determination is made whether the user sets a recurring reminder prompt time-interval at 1114. If yes, a notification is sent on occurrence of the customized prompt time-interval set by the user at 1116. The process terminates thereafter.

While the operations illustrated in FIG. 11 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 11.

Figure 12:
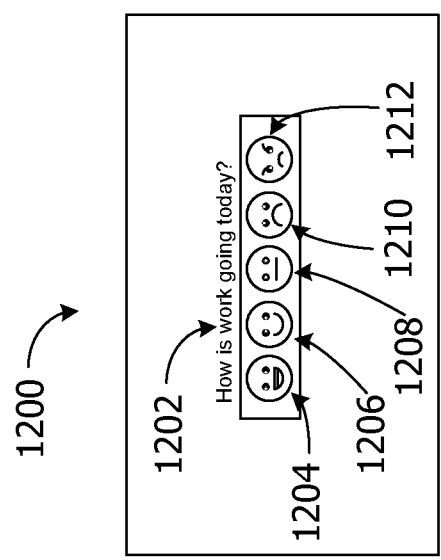
FIG. 12 is an exemplary block diagram illustrating a user interface displaying a prompt including a set of emotion indicators in accordance with an illustrative embodiment.

FIG. 12 is an exemplary block diagram illustrating a user interface device 1200 displaying a prompt 1202 including a set of emotion indicators in accordance with an illustrative embodiment. The prompt display page may be referred to as a reflection card where the user can share their feelings.

In some non-limiting examples, the set of emotion indicators include a set of five emojis representing five predefined emotion states from which a user can choose. In this example, a first emoji 1204 represents a great, fantastic, or happy state. A second emoji 1206 represents a pleasant or content state. A third emoji 1208 represents a neutral emotional state. A fourth emoji 1210 represents a sad or slightly negative emotional state. The fifth emoji 1212 represents a very sad, angry, or very negative emotional state.

Emojis are effective emotion indicators as emojis are globally and consistently applicable in representation of the emotions a user might want to journal. Each emoji represents a different mood or emotional state. For example, a smiling emoji is selected by a user to indicate the user's current emotional state is happy, content, or pleasant. A frowning emoji is selected to indicate the current emotional state is sad, discontent, or unpleasant. Emojis may be utilized to represent a wide variety of emotions, moods and/or conditions, such as, but not limited to, anger, laughter, happiness, excitement, surprise, sleepiness, confusion, sadness, neutral emotions, or any other state.

In the example shown in FIG. 12, the set of emotional state depictions includes five emojis. However, the examples are not limited to the five emojis shown. The set of emotional state depictions can include as few as two indicators, indicating a positive state or a negative emotional state. In yet other examples, the set of emotional state depictions includes three or more indicators. For example, the set of emotional state depictions can include four emojis, six emojis or any other number of emojis indicating possible emotional states.

In the example shown in FIG. 12, all the emotional state depictions in the set of emotional state depictions are emojis. However, the examples are not limited to using emojis as emotional state depictions. In other examples, the indicators are implemented as text indicators, letter indicators, number indicators, scales, ratings, percentages, symbol indicators, color indicators, or any other type of indicators. For example, an emotional state depiction can be a red indicator for a negative emotional state, a green indicator for a positive emotional state and a yellow indicator for a neutral emotional state. In another example, a letter H may be used for a happy emotional state, a letter N for a neutral emotional state and a letter S for a sad emotional state. Any other type of indicators may be used.

In the example shown in FIG. 12, the set of emotional indicators includes five specific emojis representing five emotional states. However, the examples are not limited to the five specific emojis shown in FIG. 12. In other examples, the emotional indicator emojis have different shapes or appearance than that shown in FIG. 12.

In still other examples, the emojis are user configurable. In these examples, the user can customize which emojis are presented to the user within the set of emotional response indicators. Thus, if a user does not like a default emoji displayed with the recurring reminder prompt, the user can select a different emoji or other indicator to be displayed in place of the default emoji.

In this example, the set of emotional state depictions are displayed within a work-related applications feed within a user interface device 1200. However, in other examples, the set of emotional state depictions are displayed within an insights application after the user opens the application within the user interface.

The first time this prompt 1202 is displayed to the user, a pre-load privacy teach in banner is displayed. The privacy teach banner includes a privacy notice and disclaimer regarding the fact that all information and emotion responses entered by the user into the insights application is private and not shared with any other users. The privacy teach banner can be dismissed by clicking an "X" icon in the corner of the banner.

In this example, the set of emotional state depictions shows five emojis which the user can select to add their response in order from the best mood to the worst mood, reading left to right. The worst to best mood mapped on a scale of negative two to positive two (−2->+2). This prompt 1202 can be seen in the collapsed view on the user's home page or in the modal view on top of home page depending on trigger.

In some examples, the prompt 1202 window includes an "X" in the upper right-hand corner. The user can collapse the reflection reminder prompt 1202 by clicking on the "X." When a user clicks on an emoji in the set of emotional state depictions, such as the emoji 1204, the insights application changes the display to the post-reflection card view, shown in FIG. 13 below.

Figure 13:
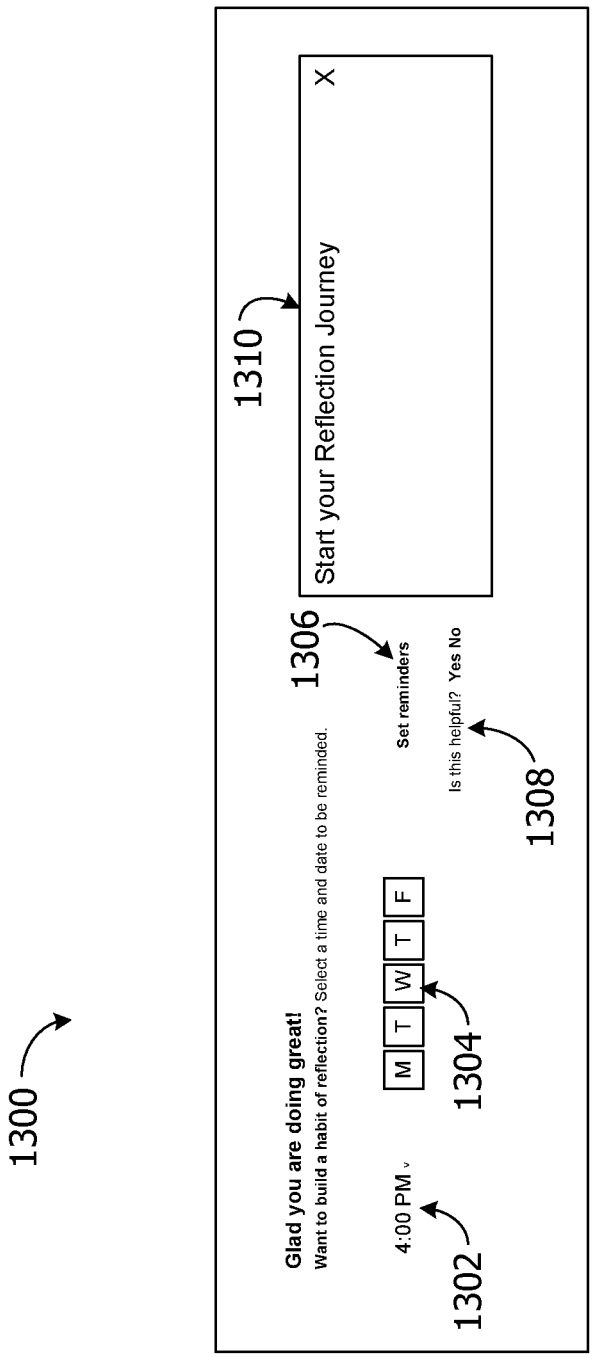
FIG. 13 is an exemplary block diagram illustrating a prompt enabling a user to set up recurring emotion journaling reminders.

FIG. 13 is an exemplary block diagram illustrating a prompt 1300 enabling a user to set up recurring emotion journaling reminders. In some examples, the prompt 1300 includes instructions 1310 encouraging the user to begin their reflections journey by setting up a recurring reminder. This view may be referred to as a post reflection card.

The prompt 1300 in this example is output to users who have not yet registered or signed up to receive recurring reminders to enter emotional response data into the insights application. The prompt encourages a user to select a time 1302 and/or day(s) 1304 to receive reminders. The selected day(s) and/or time is the user-configured prompt time-interval.

In this non-limiting example, the user sets the time 1302 and day 1304. Once selected, the user activates the set reminders 1306 control. The user can enter feedback 1308 to indicate whether the prompt was helpful to the user. The feedback may be used to customized responses and/or output provided to the user.

In some examples, the system displays the prompt automatically within a collaborative platform activity feed, such as, but not limited to, a Microsoft® Teams® activity feed. Within the activity feed, the system provides emails, voice mails, work reminders, and other activity notifications for the user to view. If the user clicks on the prompt, the system goes to the insights application homepage where the user can add responses on a recurring bases by setting a customized frequency of reminders (prompt time-interval).

Thus, in some examples, the algorithm gives the user the option to set reminder for reflecting on how they are feeling. The user is able to choose days of the week and time of the day when they would like to be reminded to take a moment to reflect. Based on user preferences of date and time, the algorithm reaches out to the user, through a notification to nudge them to reflect on how they are feeling. Once the user clicks on the notification, the algorithm brings the user to the insights application, where they can add their response to the emotional journal based on response options in the UI.

At any point of time, the system allows the user to change the frequency of reminder to suit their needs and adjust reminder notifications accordingly. Finally, the system supports historical logging of emotions. For example, if the user is enrolled in daily reflection reminder but forgot to complete reflection for yesterday's notification, the user is still able to log how they were feeling yesterday through the application.

This insights application helps users build a habit of reflection through customizable and personalized recurring reflection reminders during their work. Users can choose time during the workday and days of the workweek for reflection reminders which are inbuild into the productivity and collaboration tool, thus enabling sticky usage and promote behavioral change. The insights application is aware of users working hour and work week, including the fact that a user may be on vacation and automatically adjusts reminders based on that work-related information.

In some examples, the insights application provides information regarding the benefits of reflecting regularly on emotional well-being and privacy information to reduce the user's privacy concerns. This information is provided to encourage the users to set up the recurring reminders. If the user is not enrolled to receive reflection reminder prompts, the user can choose one or more days of the week and time. In some cases, if the user does not wish to choose a personalized day and time, a pre-selected, default prompt time-interval to receive the prompt Monday through Friday (five workdays) at 4 p.m. each day is automatically pre-selected.

In other examples, the time dropdown shows options every hour from nine a.m. to five p.m. Once the user selects the time-interval, an enrollment confirmation is displayed informing the user about the next scheduled instance of reflection (next recurring reminder prompt data and time). The user, in this example, can also optionally view historical trendline of their responses and chart header. In some examples, the insights application provides a "kudos" notification to congratulate the user on their reflection journey.

Figure 14:
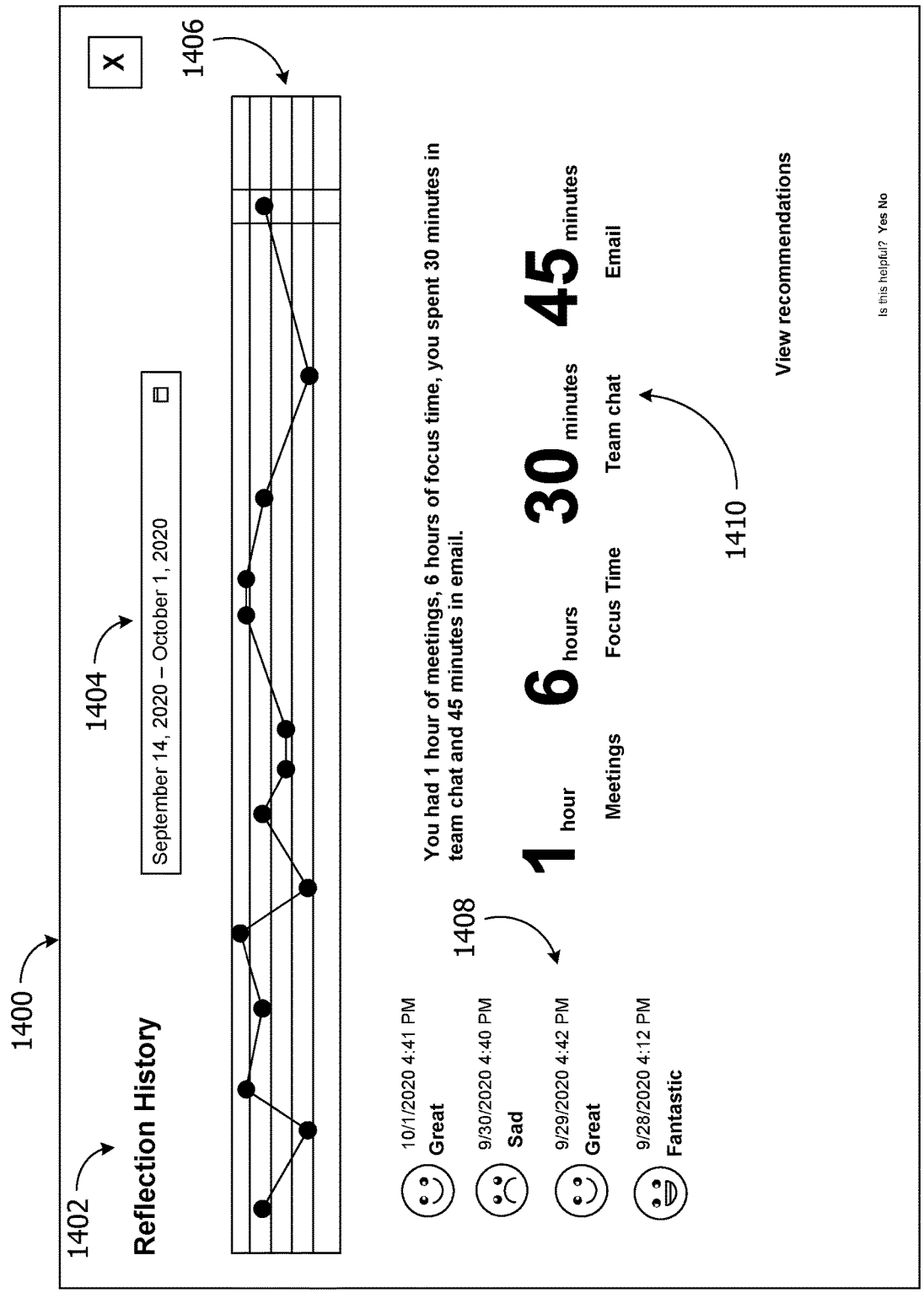
FIG. 14 is an exemplary block diagram illustrating a historical trends report.

FIG. 14 is an exemplary block diagram illustrating an historical trends report 1400. The historical trends report 1400 includes the reflection history representing historical emotional response data provided by the user during a predetermined past time-period up to the current date 1404 on which the historical trends report is generated. In this example, the reflection history data recorded during a given time period is represented as a line graph 1406. The line graph is a trend line of how the user has been feeling over time. In this example, the trend line plots the user's response data over the last thirty calendar days. The longer the user utilizes the system, the further back the trends can go.

In this example, the emotional response data is also represented as a distribution list 1408. The distribution list shows the number of each response type received from the user over the last thirty days. The user is able to go back/forward in time within the thirty-day time span by selecting the up or down arrow. For example, if the chart shows response for Day T to T+30, by selecting the up arrow it will show data for Day T−1 to T−31. If selected down arrow it will show T+31 to T+61. In other examples, the emotional response data provided by the user over the past time-period can also be represented as a bar graph, chart, summary, or any other suitable format.

The historical trends report 1400, in some examples, includes a reflection history 1402. The reflection history is a history of user responses entered as a result of reflecting on their emotions. The reflection history 1402 can optionally include insights provided by the user as well as predicted insights generated by the insights application. In this example the insights include a list of work-related events which may be associated with the user's current emotional state. In this example, the insights include a listing of the number of hours the user spent on the current date 1404 performing work-related tasks, such as, but not limited to, responding to email, participating in meetings, focus time, etc.

The insights application, in other examples, logs user responses in a database which is private and only available for user to query through the software insights application. The user is able to see a distribution of their responses over a given period of time. The given period of time can be a week, a month, the last 30 calendar days, a year or as far back to the first date the user provided a response to the reflection prompt. The user is also be able to see their emotional response trend so that they can gather insights around how they have been feeling over a period.

Work-related data 1410 may also be provided. The work-related data is data such as, but not limited to, the work-related data 220 in FIG. 2 and the work-related data 308 in FIG. 3. The work-related data includes information on work tasks and work-related events performed on the day when a given emotional state response was entered by the user. In this example, the work-related data can include information on how many hours the user spent on tasks, such as, answering email, participating in meetings, focus work, etc.

The insights application, in still other examples, helps users track how consistent they have been in keeping up with a set of reflection reminders and celebrate streaks and achievement of building a habit of emotional awareness. If a user begins to become lax or inconsistent with providing emotional response data such that the user is not keeping up with the habit, the system nudges the user to get back on track by communicating the benefits of emotional awareness and helping change frequency of reflection in line with users' goal of building a habit of emotional awareness.

Figure 15:
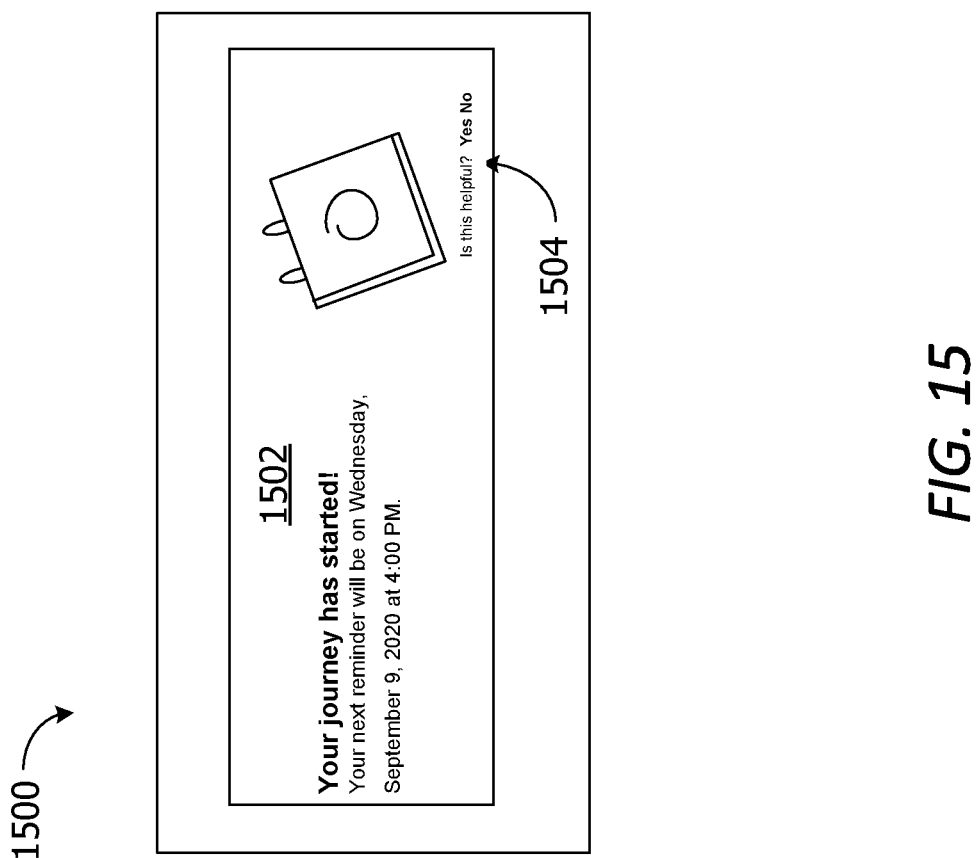
FIG. 15 is an exemplary block diagram illustrating a user interface displaying a notification that prompt reminders have successfully been setup.
Figure 16:
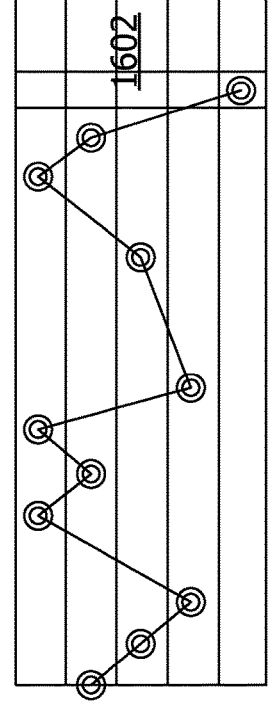
FIG. 16 is an exemplary block diagram illustrating a historical trends report for a thirty-day time-period.

FIG. 15 is an exemplary block diagram illustrating a user interface 1500 displaying a notification 1502 that prompt reminders have successfully been setup. The notification optionally includes a feedback prompt 1504 enabling the user to provide feedback FIG. 16 is an exemplary block diagram illustrating a historical trends report 1600 for a thirty-day time-period. The historical trends report in this non-limiting example outputs all the emotional response data provided by the user during the thirty-day time period in the form of a line graph 1602 and a bar graph 1604. This enables a user to see well-being trends for the month at a glance.

Figure 17:
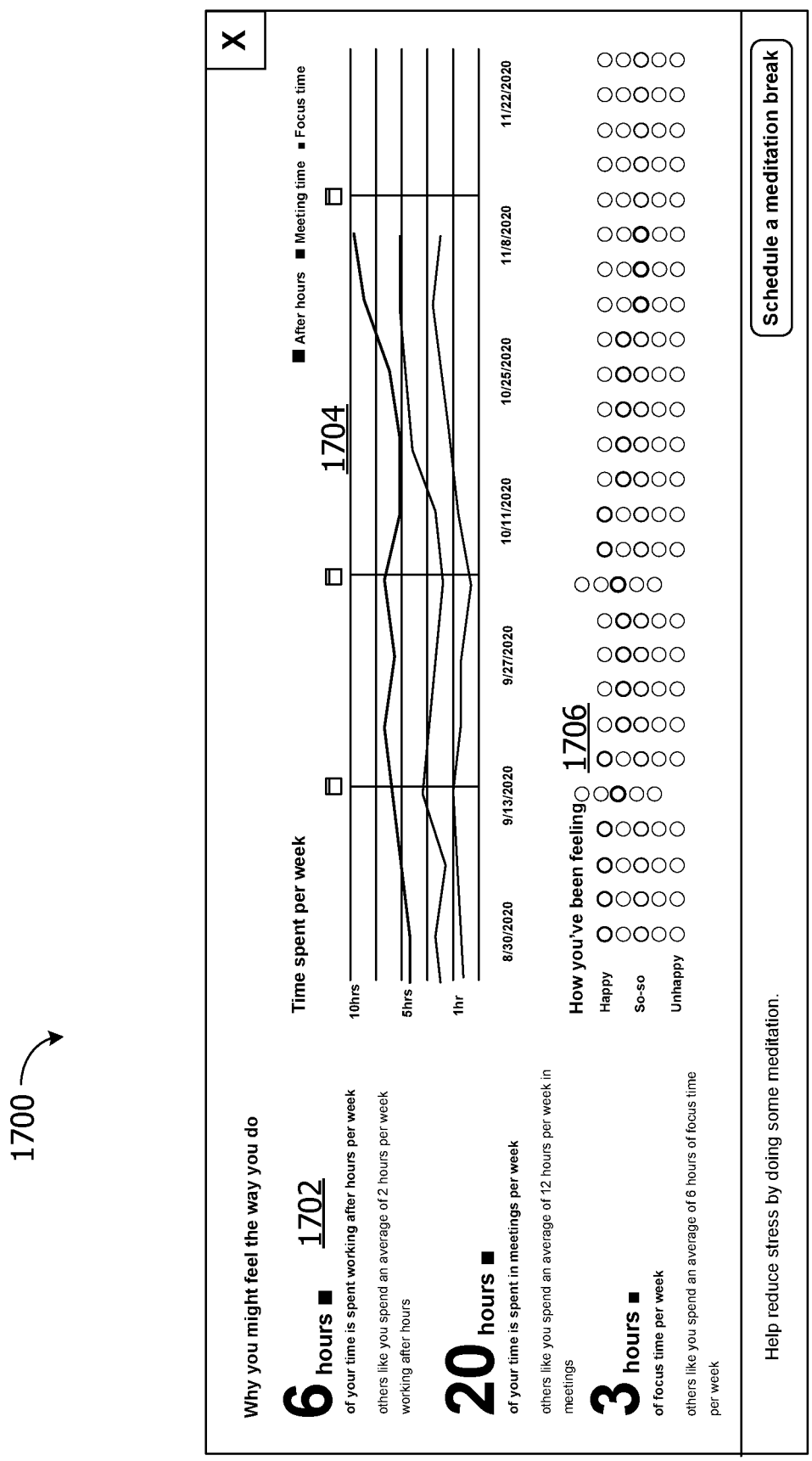
FIG. 17 is an exemplary block diagram illustrating a user interface displaying historical trends and insights associated with a current emotional state of a user.

FIG. 17 is an exemplary block diagram illustrating historical trends and insights 1700 associated with a current emotional state of a user. In this example, a side bar 1702 presents a list of work-related activities and the amount of time spent on each activity during the given day. The line graphs 1704 present historical well-being data at a glance. In other examples, the insights include a chart 1706 displaying the user's emotional state responses over a given period of time.

Figure 18:
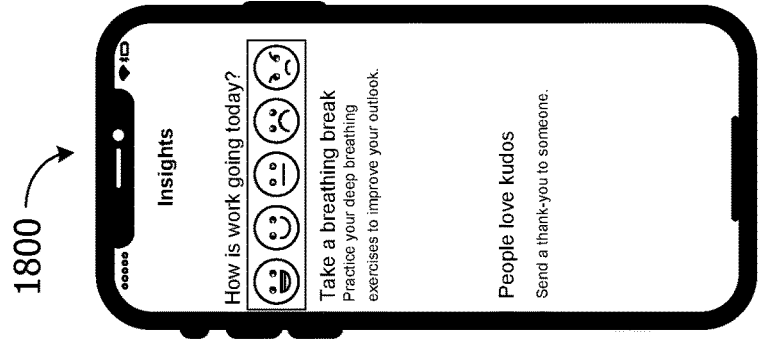
FIG. 18 is an exemplary block diagram illustrating a user device displaying a prompt with a question and a set of emotional state depictions within a user interface.

FIG. 18 is an exemplary block diagram illustrating a user device 1800 displaying a prompt with a question and a set of emotional state depictions within a user interface. In this example, the set of indicators includes five emojis. The user selects a given emoji by touching a portion of the user interface touch screen corresponding with the selected emoji.

Figure 19:
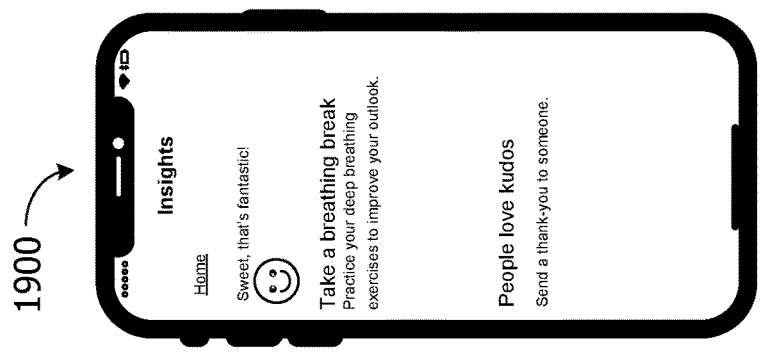
FIG. 19 is an exemplary block diagram illustrating a user device displaying an acknowledgement of a response provided by the user within the user interface.

FIG. 19 is an exemplary block diagram illustrating a user device 1900 displaying an acknowledgement of a response provided by the user within the user interface. The acknowledgement indicates the user's selected emotional state depiction has been accepted and recorded.

Figure 20:
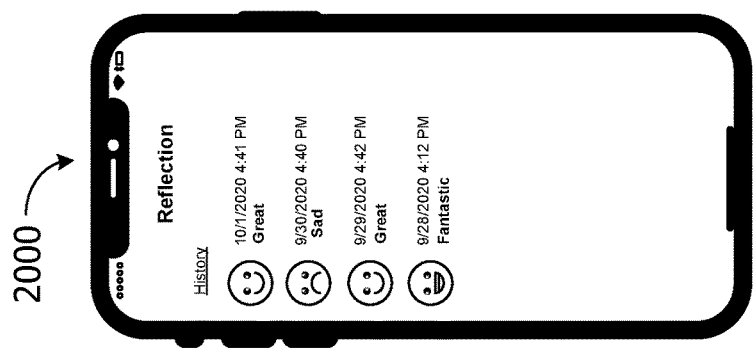
FIG. 20 is an exemplary block diagram illustrating a user device displaying a history trends report within the user interface.

FIG. 20 is an exemplary block diagram illustrating a user device 2000 displaying a history trends report within the user interface. The historical trends report presents the user's emotional state responses for a set of two or more days within a list, graph, chart, summary, or other format.

Figure 21:
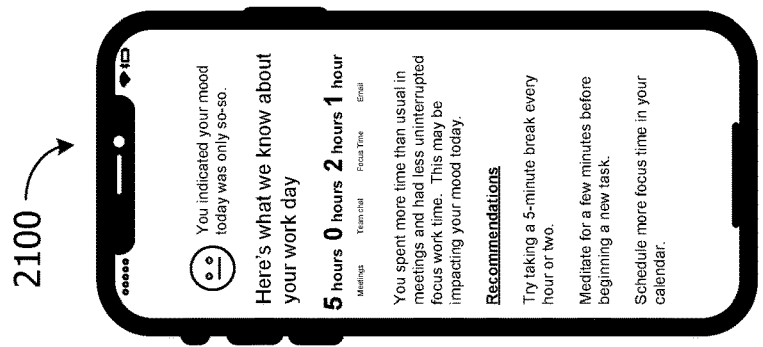
FIG. 21 is an exemplary block diagram illustrating a user device displaying insights and recommendations associated with a current emotional state of a user.

FIG. 21 is an exemplary block diagram illustrating a user device 2100 displaying insights and recommendations associated with a current emotional state of a user. The recommendations include at least one recommended action. A recommended action to improve the user's well-being can include, for example but without limitation, taking time for meditation, going for a walk, blocking time for focus work, etc.

In this manner, the system assists employees become more mindful of their emotional well-being in the flow of work and is integrated deeply into their core collaboration device, such as, but not limited to, Microsoft® Teams®. Further, the algorithms not only help nudge user to think about their well-being, but it also helps users capture and track their emotions and build a habit of emotional awareness through personalized emotional check-in reminders. The algorithm further leverages the deep understand of the user work habits and sheds light on things each user can do to improve their well-being.

ADDITIONAL EXAMPLES

Some aspects and examples disclosed herein are directed to a system, method and/or computer executable instructions for providing well-being journaling prompts, generating well-being insights and recommendations based on emotion journaling, comprising: a processor; and a computer-readable medium storing instructions that are operative upon execution by the processor to: prompt a user with a question associated with their emotional well-being at an occurrence of a user-configured prompt time-interval via a user interface device; analyze historical emotion response data provided by the user with work-related data obtained from a set of collaborative work-related applications; generate a set of insights associated with the current emotional state of the user; and display a set of recommended actions to be taken by the user in response to the current emotional state of the user.

Additional aspects and examples disclosed herein are directed to a system, method or computer executable instructions for transmitting, by a communications interface device, a prompt to a user interface device via a network, the prompt comprising a pre-defined question associated with the emotional well-being of the user, wherein the prompt includes a set of emotional state depictions representing a set of possible emotional states of the user; receiving, by the user interface device, es a user response to the prompt, wherein the response comprises a selection of a depiction from the set of emotional state depictions indicating a current emotional state of the user; recording, by a data storage device, the indicated current emotional state of the user, wherein the data storage device stores user data, including historical emotion response data and a journal, the journal comprising a set of entries, wherein the indicated current emotional state of the user is recorded within at least one entry in the set of entries; analyzing the historical emotion response data with current work-related data obtained from a one or more collaborative work-related applications associated with the user, the historical emotion response data including the emotion response indicating the current emotional state of the user; inferring causes of the current emotional state of the user by correlating the historical emotion response data with the work-related data obtained from the one or more collaborative work-related applications; and generating a set of insights associated with the current emotional state of the user based on the inferred causes of the current emotional state of the user, the one or more insights including at least one potential reason for the current emotional state of the user, wherein the one or more insights are presented to the user via the user interface device.

Additional aspects and examples disclosed herein are directed to a system, method and/or one or more computer storage devices having computer-executable instructions stored thereon for providing customized emotion journaling prompts, emotional state insights and recommended actions, which, on execution by a computer, cause the computer to perform operations comprising: prompting a user with a question associated with their emotional well-being at an occurrence of a user-configured prompt time-interval via a user interface device; analyzing historical emotion response data provided by the user with work-related data obtained from a one or more collaborative work-related applications; generating one or more insights associated with the current emotional state of the user, the one or more insights including at least one potential reason for the current emotional state of the user; and displaying a set of recommended actions to be taken by the user in response to the current emotional state of the user.

Some examples provide an automation feature providing a recurring reminder/prompt to solicit emotional response/journaling, based on user-configured timing, personalized to each user. The system correlates emotional history/journaling with workplace/collaboration/productivity data to infer causes of emotional state and suggest/recommend ways to improve emotional state. The system prompts the user with a question prompting further reflection in real-time at the time of an emotional state selection to capture user-determined causes for a particular emotional response, and store that in the journal for later reflection/follow-up. The follow-up in some examples is selected from pre-formed response prompts, within the context of work, to further identify what impacts a user's well-being.

Other examples provide an emotional awareness journaling via an insights application for providing emotional check-in reminders and capture user responses. The application, in these examples, hosts a range of features, including emotional check-in using a set of emotion indicators. The application enables the user to journal for emotions and well-being in a workplace context as a workplace tool. The user can at any time, open the application and enter emotional response data into the application. The recorded responses are private. No one else sees a given users personal journal responses, except for the user entering those responses.

In an example scenario, when a user selected recurring reminder prompt-interval occurs, a daily reflection prompt including a question such as "How are you feeling?" is displayed along with a set of emojis. The user selects an emoji which most closely corresponds to the user's current emotional state. The user's response is recorded/saved. A secondary prompt is then displayed to the user along with a follow-up questions designed to elicit additional information associated with the user's current emotional state.

In some examples, the follow-up question is customized to the user. The follow-up question may be a question such as, "Do you know why you might be feeling that way?" The user can enter a free-form text response to the follow-up question or select a pre-defined response from a set of pre-defined responses. A pre-defined response may include responses such as, but not limited to, "I need more time for focus work", "I had a good meeting," "I slept well," and/or "I had no time for lunch." Other preset responses may also be included. In this manner, the system uses emotional check-in prompt which is scientifically accurate and easy-to-respond-to questions to invoke responses from users around their emotional valence and arousal without complicating or confusing the users.

The insights application, in other examples, provides personalized insights around potential causes which might be impacting emotional well-being; use info from email, calendar, chat, teams, everything available used with user responses and prompts to generate reasons for user responses/personalized insights. It determines potential reasons for the user's emotional state by applying rich analytics to data, such as, but not limited to, the time spent per week at work during work hours, after work hours, meeting hours, focus hours and/or graph(s) of emotional check-ins (feelings journal), to infer things that may be tied to how you felt on a day/week. The insights application algorithm makes customized insights based on inferences drawn from individual users work/enterprise data (calendar data, collaboration/usage, etc.), emotional journaling, to provide proactive personalized recommendations. The algorithm further helps users with passive and active insights so that they can better manage emotions.

In an example scenario, if a user is feeling sad or unhappy, the insights application nudges the user to reflect on why they might be feeling sad or unhappy and offers solutions around mindfulness, such as meditation, taking a break to stretch, taking deep breath etc. Depending on users work habits, it offers personalized insights to the user to help develop good habits for overall well-being.

For example, if a user is feeling sad and has been working a significant amount of time outside of working hour, the algorithm nudges the user to consider blocking time within the day to catch up on work and even help book time. The algorithm leverages all the well-being impact metrics and calculations previously filed for patent to personalize insights to user and help them improve their well-being.

In another example, if the user is feeling unhappy, the algorithm suggests changes to work habits such as working too much or working outside working hours or heavy meeting overload or lack of one-on-one time with a manager or lack of time to focus on deep work etc. Similarly, if the user is feeling happy, the algorithm nudges the user to reflection on why they might be feeling happy so that they can build a habit of it. It also offers solutions such a nudging the user to send praise to their colleagues if they are one of the reasons for their happiness. Recognizing colleagues for their contribution builds a habit of gratitude and further improves well-being.

Alternatively, or in addition to the other examples described herein, examples include any combination of the following:
  display an historical trends report describing changing emotional state of the user over a predetermined time-period based on historical emotion response data of the user;
  transmitting the prompt at a user-configured prompt time-interval, wherein the user-configured prompt time-interval comprises a set of days and times at which a prompt with the question including the set of emotional state depictions is presented to the user;
  enable the user to select the user-configured prompt time-interval, wherein the user-configured prompt time-interval comprises a set of days and times at which a prompt with the question including the set of emotional state depictions is presented to the user;

generating an anonymized historical trends report including anonymized emotional well-being data;

generate a historical reflection report displaying a historical emotional state of the user over a predetermined time-period based on historical emotion response data of the user, wherein the historical reflection report includes at least one inferred insight associated with each historical emotional state of the user;

displaying the one or more insights and the at least one recommendation to the user via the user interface;

prompting the user to provide feedback indicating whether the one or more insights and the at least one recommendation was helpful to the user;

provide a secondary prompt comprising a follow-up question to elicit additional information regarding at least one of the current emotional state of the user and a reason for the current emotional state of the user;

analyze the emotion response of the user with the historical emotion response data, the work-related and user-provided feedback data by a machine learning using pattern recognition data to identify the at least one potential reason for the current emotional state and the set of recommended actions;

track and record emotional well-being data for a plurality of users over time; anonymized the emotional well-being data; and generate an anonymized historical trends report based on the anonymized well-being data;

analyze the historical emotion response data and the one or more insights with current work-related data obtained from a one or more collaborative work-related applications associated with the user, the historical emotion response data including the emotion response indicating the current emotional state of the user;

generate a recommendation associated with the current emotional state of the user based on the inferred causes of the current emotional state of the user and the one or more insights, the recommendation comprising a one or more actions to be taken by the user in response to the indicated current emotional state of the user; and provide a secondary prompt in real time responsive to the user selection of an emotional state depiction indicating the current emotional state of the user, the secondary prompt comprising a follow-up question to elicit additional information regarding at least one of the current emotional state of the user and a reason for the current emotional state of the user.

While the aspects of the disclosure have been described in terms of various examples with their associated operations, a person skilled in the art would appreciate that a combination of operations from any number of different examples is also within scope of the aspects of the disclosure.

Example Operating Environment

Figure 22:
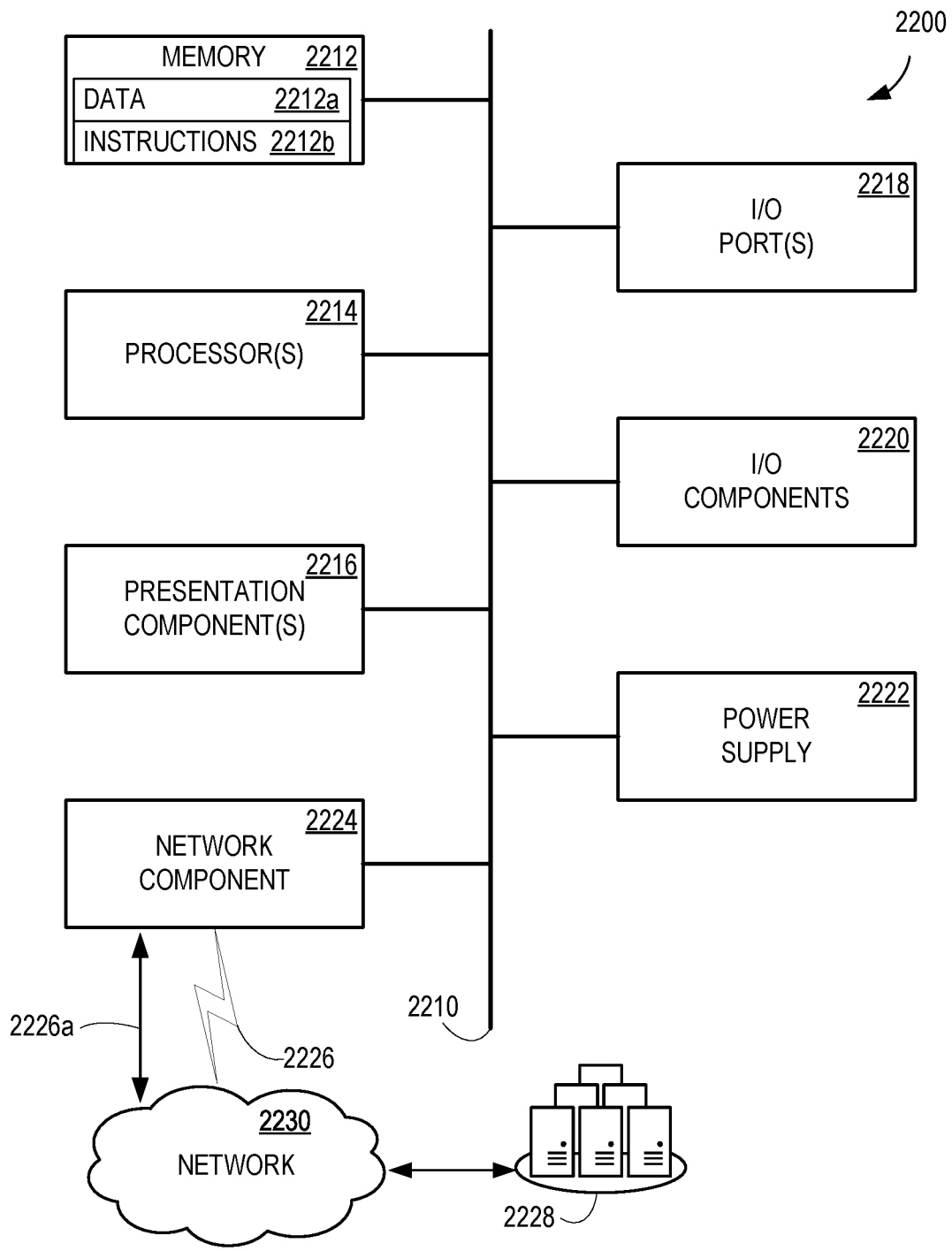
FIG. 22 is exemplary block diagram illustrating an example computing environment suitable for implementing some of the various examples disclosed herein.

FIG. 22 is a block diagram of an example computing device 2200 for implementing aspects disclosed herein and is designated generally as computing device 2200. Computing device 2200 is an example of a suitable computing environment and is not intended to suggest any limitation as to the scope of use or functionality of the examples disclosed herein. Neither should computing device 2200 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 2200 includes a bus 2210 that directly or indirectly couples the following devices: computer-storage memory 2212, one or more processors 2214, one or more presentation components 2216, I/O ports 2218, I/O components 2220, a power supply 2222, and a network component 2224. While computing device 2200 is depicted as a seemingly single device, multiple computing devices 2200 may work together and share the depicted device resources. For example, memory 2212 may be distributed across multiple devices, and processor(s) 2214 may be housed with different devices.

Bus 2210 represents what may be one or more busses (such as an address bus, data bus, or a combination thereof). Although the various blocks of FIG. 22 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 22 and the references herein to a "computing device." Memory 2212 may take the form of the computer-storage media references below and operatively provide storage of computer-readable instructions, data structures, program modules and other data for computing device 2200. In some examples, memory 2212 stores one or more of an operating system, a universal application platform, or other program modules and program data. Memory 2212 is thus able to store and access data 2212a and instructions 2212b that are executable by processor 2214 and configured to carry out the various operations disclosed herein.

In some examples, memory 2212 includes computer-storage media in the form of volatile and/or nonvolatile memory, removable or non-removable memory, data disks in virtual environments, or a combination thereof. Memory 2212 may include any quantity of memory associated with or accessible by computing device 2200. Memory 2212 may be internal to computing device 2200 (as shown in FIG. 22), external to computing device 2200 (not shown), or both (not shown). Examples of memory 2212 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 2200. Additionally, or alternatively, memory 2212 may be distributed across multiple computing devices 2200, for example, in a virtualized environment in which instruction processing is carried out on multiple computing devices 2200. For the purposes of this disclosure, "computer storage media," "computer-storage memory," "memory," and "memory devices" are synonymous terms for computer-storage memory 2212, and none of these terms include carrier waves or propagating signaling.

Processor(s) 2214 may include any quantity of processing units that read data from various entities, such as memory 2212 or I/O components 2220 and may include CPUs and/or GPUs. Specifically, processor(s) 2214 are programmed to execute computer-executable instructions for implementing aspects of the disclosure. The instructions may be performed by the processor, by multiple processors within computing device 2200, or by a processor external to client computing device 2200. In some examples, processor(s) 2214 are programmed to execute instructions such as those illustrated in the in the accompanying drawings. Moreover, in some examples, processor(s) 2214 represent an implementation of analog techniques to perform the operations described herein. For example, the operations may be performed by an analog client computing device 2200 and/or a digital client computing device 2200. Presentation component(s) 2216 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 2200, across a wired connection, or in other ways. I/O ports 2218 allow computing device 2200 to be logically coupled to other devices including I/O components 2220, some of which may be built in. Example I/O components 2220 include, for example but without limitation, a microphone, joystick, game pad, satellite dish, scanner, printer, wireless device, etc.

Computing device 2200 may operate in a networked environment via network component 2224 using logical connections to one or more remote computers. In some examples, network component 2224 includes a network interface card and/or computer-executable instructions (e.g., a driver) for operating the network interface card. Communication between computing device 2200 and other devices may occur using any protocol or mechanism over any wired or wireless connection. In some examples, network component 2224 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 2224 communicates over wireless communication link 2226 and/or a wired communication link 2226a to a cloud resource 2228 across network 2230. Various different examples of communication links 2226 and 2226a include a wireless connection, a wired connection, and/or a dedicated link, and in some examples, at least a portion is routed through the internet.

Although described in connection with an example computing device 2200, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for emotional insight management, the system comprising:
   a communications interface device that transmits an initial prompt to a user interface device via a network, the initial prompt comprising a pre-defined question associated with emotional well-being of a user, wherein the initial prompt includes a set of emotional state depictions, each emotional state depiction representing a different emotional state;
   the user interface device that receives a user response to the initial prompt, wherein the user response comprises a selection of an individual emotional state depiction from the set of emotional state depictions, the selection indicating a current emotional state of the user;
   a data storage device storing user data, including historical emotion response data and an electronic journal, the electronic journal comprising a set of entries, wherein the current emotional state of the user is recorded within at least one entry in the set of entries;
   a computer-readable medium storing instructions that are operative upon execution by a processor to:
   obtain current work-related data from a collaborative work-related application associated with the user;
   analyze the historical emotion response data with the current work-related data, the historical emotion response data including the user response indicating the current emotional state of the user;
   determine a cause of the current emotional state of the user by correlating the historical emotion response data with the current work-related data; and
   generate an insight associated with the current emotional state of the user based on the determined cause of the current emotional state of the user, the insight including a potential reason for the current emotional state of the user;
      generate a recommendation based on the determined cause of the current emotional state of the user and the insight, the recommendation comprising a recommended action to be taken by the user in response to the current emotional state of the user;
      display the insight and the recommendation via the user interface device;
      prompt the user to provide feedback indicating whether the recommended action was helpful to improve the current emotional state of the user, the feedback used to refine other generated insights and recommendations for the user;
      analyze the feedback with pattern recognition data to further refine the insight and the recommended action; and
      customize the recommended action based on the historical emotion response data and the feedback.

2. The system of claim 1, wherein a selectable user interface element is provided with the recommended action, the selectable user interface element comprising a link to a calendar application.

3. The system of claim 1, wherein the instructions are further operative to:
   transmit the initial prompt at a user-configured prompt time-interval, wherein the user-configured prompt time-interval comprises a set of days and times at which the initial prompt with the pre-defined question including the set of emotional state depictions is presented to the user.

4. The system of claim 1, wherein the work-related application comprises at least one of a messaging application, a task managing application, and a video conferencing application.

5. The system of claim 1, wherein the instructions are further operative to:
   receive a request for a survey from a first user; and
   prompt a second user to provide emotional well-being data, wherein the emotional well-being data provided by the second user is transmitted to the first user.

6. The system of claim 1, wherein the instructions are further operative to:
   notify the user to provide emotional well-being data by displaying the initial prompt within a collaborative work-related application in the one or more collaborative work-related applications, wherein the initial prompt includes a link to the electronic journal.

7. A method of emotional insight management, the method comprising: receiving, by a user interface device, a user response to an initial prompt, the initial prompt comprising a pre-defined question associated with emotional well-being of a user, wherein the user response comprises a selection of a depiction from a set of emotional state depictions, each emotional state depiction representing a different emotional state, wherein a depiction selected by the user indicates a current emotional state of the user; obtaining current work-related data from a collaborative work-related application associated with the user; analyzing the historical emotion response data with the current work-related data, the historical emotion response data comprising the current emotional state of the user; determining a cause of the current emotional state of the user by correlating the historical emotion response data with the current work-related data; generating an insight associated with the current emotional state of the user based on the determined cause of the current emotional state of the user, the insight including a predicted reason for the current emotional state of the user; generating a recommendation associated with the current emotional state of the user based on the insight, the current work-related data, and the historical emotion response data, wherein the recommendation comprises a recommended action to be performed by the user in response to the current emotional state of the user; displaying the insight and the recommendation via the user interface device; prompting the user to provide feedback indicating whether the recommended action was helpful to improve the current emotional state of the user, the feedback used to refine other generated insights and recommendations for the user; analyzing the feedback with pattern recognition data to further refine the insight and the recommended action; and customizing the recommended action based on the historical emotion response data and the feedback.

8. The method of claim 7, wherein a selectable user interface element is provided with the recommended action, the selectable user interface element comprising a link to a calendar application.

9. The method of claim 7, wherein the work-related application comprises at least one of a messaging application, a task managing application, and a video conferencing application.

10. The method of claim 7, further comprising:
generating a historical reflection report displaying a historical emotional state of the user over a predetermined time-period based on the historical emotion response data of the user, wherein the historical reflection report includes at least one insight associated with each historical emotional state of the user.

11. The method of claim 7, further comprising:
notifying the user to provide emotional well-being data by displaying the initial prompt within a collaborative work-related application in the one or more collaborative work-related applications, wherein the initial prompt includes a link to a well-being journal.

12. The method of claim 7, further comprising:
generating an anonymized historical trends report based on anonymized emotional well-being data, wherein the anonymized historical trends report is generated for a group in response to a number of users in the group exceeding a minimum threshold number.

13. One or more computer storage devices having computer-executable instructions stored thereon for emotional insight management, which, on execution by a computer, cause the computer to perform operations comprising:
receiving, by a user interface device, a user response to an initial prompt, wherein the user response comprises a selection of a depiction from a set of emotional state depictions indicating a current emotional state of a user, wherein each depiction in the set of emotional state depictions represents a different emotional state;
obtaining current work-related data from a collaborative work-related application associated with the user;
analyzing the historical emotion response data with the current work-related data, the historical emotion response data including the current emotional state of the user;
determining a cause of the current emotional state of the user by correlating the historical emotion response data with the current work-related data; and
generating an insight associated with the current emotional state of the user based on the determined cause of the current emotional state of the user, the insight including a potential reason for the current emotional state of the user;
generating a recommendation based on the determined cause of the current emotional state of the user and the insight, the recommendation comprising a recommended action to be taken by the user in response to the current emotional state of the user;
displaying the insight and the recommendation via the user interface device;
prompting the user to provide feedback indicating whether the recommended action was helpful to improve the current emotional state of the user;
analyzing the feedback with pattern recognition data to further refine the insight and the recommended action; and
customizing the recommended action based on the historical emotion response data and the feedback.

14. The one or more computer storage devices of claim 13, wherein a selectable user interface element is provided with the recommended action, the selectable user interface element comprising a link to a calendar application.

15. The one or more computer storage devices of claim 13, wherein the operations further comprise:
transmitting the initial prompt to the user interface device associated with the user at a user-configured prompt time-interval, wherein the user-configured prompt time-interval comprises a set of days and times at which the initial prompt with a pre-defined question including the set of emotional state depictions is presented to the user.

16. The one or more computer storage devices of claim 13, wherein the operations further comprise:
generating an anonymized historical trends report including anonymized emotional well-being data, wherein the anonymized historical trends report is generated for a group in response to a number of users in the group exceeding a minimum threshold number.

17. The one or more computer storage devices of claim 13, wherein the operations further comprise:
generating a historical reflection report displaying a historical emotional state of the user over a predetermined time-period based on the historical emotion response data of the user, wherein the historical reflection report includes at least one insight associated with each historical emotional state of the user.

18. The one or more computer storage devices of claim 13, wherein the operations further comprise:
notifying the user to provide emotional well-being data by displaying the initial prompt within a collaborative work-related application in the one or more collaborative work-related applications, wherein the initial prompt includes a link to a well-being journal.

* * * * *